(12) United States Patent
Moore et al.

(10) Patent No.: US 12,030,626 B2
(45) Date of Patent: Jul. 9, 2024

(54) VERTICAL TAKE-OFF AND LANDING (VTOL) AIRCRAFT

(71) Applicant: AMSL INNOVATIONS PTY LTD, Stanmore (AU)

(72) Inventors: Andrew Dudley Moore, Stanmore (AU); John Wilson, Stanmore (AU)

(73) Assignee: AMSL INNOVATIONS PTY LTD, Stanmore (AU)

( * ) Notice: Subject to any disclaimer, the term of this patent is extended or adjusted under 35 U.S.C. 154(b) by 253 days.

(21) Appl. No.: 17/441,007

(22) PCT Filed: Mar. 19, 2020

(86) PCT No.: PCT/AU2020/050261
§ 371 (c)(1),
(2) Date: Sep. 20, 2021

(87) PCT Pub. No.: WO2020/186305
PCT Pub. Date: Sep. 24, 2020

(65) Prior Publication Data
US 2022/0161927 A1    May 26, 2022

(30) Foreign Application Priority Data

Mar. 21, 2019  (AU) ................................ 2019900954

(51) Int. Cl.
*B64C 29/00*  (2006.01)
*B64C 9/18*   (2006.01)
(Continued)

(52) U.S. Cl.
CPC ............ *B64C 29/0033* (2013.01); *B64C 9/18* (2013.01); *B64C 9/24* (2013.01); *B64C 13/28* (2013.01);
(Continued)

(58) Field of Classification Search
CPC ...... B64C 29/0033; B64C 39/068; B64C 9/18
See application file for complete search history.

(56) References Cited

U.S. PATENT DOCUMENTS 3,131,873 A * 5/1964 Sanders .............. B64C 29/0025
                                                        244/12.3
3,179,354 A   4/1965 Alwarez
(Continued)

FOREIGN PATENT DOCUMENTS

| CN | 108408043 A   | 8/2018 |
| WO | 2015019255 A1 | 2/2015 |
| WO | 2020186305 A1 | 9/2020 |

OTHER PUBLICATIONS

International Search Report and Written Opinion for PCT/AU2020/050261 dated May 4, 2020 by the Australian Patent Office, 8 pages.

*Primary Examiner* — Tien Q Dinh
*Assistant Examiner* — William L Gmoser
(74) *Attorney, Agent, or Firm* — Ballard Spahr LLP

(57) ABSTRACT

A vertical take-off and landing (VTOL) aircraft (100) having: a wing structure having right and left side forward wings (20, 22); and right and left side rearward wings (30, 32), each of the right side wings (20, 30) being connected, and each of the left side wings (22, 32) being connected in a box wing configuration; wherein each wing (20, 22, 30, 32) has a fixed leading edge (100) and at least one moveable trailing control surface (110), further wherein each wing (20, 22, 30, 32) has at least one motor pod (195), the motor pod (195) being pivotally mounted to an underside of the fixed leading edge (100), and fixedly secured to the trailing control surface (110).

25 Claims, 19 Drawing Sheets

(51) Int. Cl.
  *B64C 9/24*    (2006.01)
  *B64C 13/28*   (2006.01)
  *B64C 13/50*   (2006.01)
  *B64C 35/00*   (2006.01)
  *B64C 39/06*   (2006.01)
  *B64D 27/24*   (2006.01)

(52) U.S. Cl.
  CPC ............ *B64C 13/50* (2013.01); *B64C 35/001* (2013.01); *B64C 39/068* (2013.01); *B64D 27/24* (2013.01); *B64C 2211/00* (2013.01)

(56) References Cited

U.S. PATENT DOCUMENTS

| | | | |
|---|---|---|---|
| 3,181,810 A | 5/1965 | Olson | |
| 4,120,470 A * | 10/1978 | Whitener | B64C 9/323 |
| | | | 244/215 |
| 10,183,746 B2 * | 1/2019 | McCullough | B64D 25/12 |
| 2015/0266571 A1 * | 9/2015 | Bevirt | B64C 11/28 |
| | | | 244/7 C |
| 2015/0344134 A1 | 12/2015 | Cruz | |
| 2016/0288903 A1 * | 10/2016 | Rothhaar | B64C 9/04 |
| 2016/0311522 A1 | 10/2016 | Lilium | |

\* cited by examiner

VERTICAL TAKE-OFF AND LANDING (VTOL) AIRCRAFT

CROSS-REFERENCE TO RELATED APPLICATIONS

This application is a national stage filing under 35 U.S.C. § 371 of International Application No. PCT/AU2020/050261, filed on Mar. 19, 2020, which claims benefit of Australian patent application No. 2019900954, filed Mar. 21, 2019. These applications are incorporated herein by reference in their entireties.

TECHNICAL FIELD

The present disclosure relates to a vertical take-off and landing (VTOL) aircraft. In particular, the present invention relates to a VTOL aircraft having passenger and/or military and/or navy applications.

BACKGROUND OF THE INVENTION

VTOL aircraft are capable of take-off and landing vertically, or at some angle which is close to vertical. This style of aircraft includes helicopters and certain fixed wing aircraft, often used for military applications. Advantageously, VTOL aircraft permit take-off and landing in limited spaces, which negates the need for a large runway, and permits take-off and landing in small spaces and such as boat decks and landing pads on buildings and other structures.

Helicopters are a style of aircraft in which lift and thrust are both provided by rotors. There are several issues associated with helicopters which may be problematic in some applications, such as the high levels of noise output. One such disadvantage associated with helicopters concerns the rotor design which is critical for flight. There is generally no redundancy in the design, meaning that operation of the (or each) rotor is critical. This lack of redundancy dictates that large factors of safety must be applied to all components of the rotor and drive train, which adds considerably to the weight and manufacture cost of helicopters.

Electric aircraft are of increasing interest for various commercial and safety reasons. In recent years there has been a large amount of development with respect to drone technologies, which generally utilise a plurality of electric rotors spaced around a pitch circle diameter. Drones generally operate with the electric rotors each rotating about an axis which is generally vertical.

Whist drones are becoming commercially viable for delivering small payloads, they are generally limited to relatively low flight speeds, on account of the vertical axis of rotation of the rotors. Furthermore, they tend to have reasonably low ranges of travel per battery charge.

Tilt wing aircraft are available and generally operate on the principle of a vertical propeller axis for take-off and landing, and the wings are configured to tilt between a configuration in which the propellers have vertical axes for take-off and landing, and a configuration in which the propellers have horizontal axes for forward flight.

The above noted tilt wing arrangement provides the advantage of take-off and landing in areas with limited available clear space, such as aircraft carriers and landing pads. In addition, tilt wing aircraft are able to provide flight speed comparable with conventional propeller driven fixed wing planes.

Tilt wing aircraft generally have electric motors or gas turbine engines which drive propellers or ducted fans directly mounted to the wing. The entire wing rotates between vertical and horizontal to tilt the thrust vector from vertical to horizontal and return.

By way of definition, the "Thrust line" also referred to as the "thrust vector" is the thrust force of the propeller and is approximately the same as axis of rotation of the propeller. The "hinge line" is the axis of the hinge rotation.

There are several inherent disadvantages with existing tilt wing aircraft. One disadvantage concerns the actuators and bearings or other such mechanisms required to control the angle of inclination of the wing between the take-off/landing configuration and the forward flight configuration. The actuators may also serve to lock the wing at the desired inclination during forward flight. However, in practice, the actuators and bearings add significant weight to the aircraft. This results in a reduction of the amount of payload such as personnel or cargo that can be transported. Furthermore, because of the critical nature of the wing tilt actuation system and bearings, that assembly must be designed with a sufficient degree of redundancy to reduce the risk of catastrophic failure.

An electric VTOL jet is currently being designed and tested by Lilium Aviation, under the brand Lilium Jet™. That prototype is intended as a lightweight commuter aircraft for two passengers having two wings and around 36 electric motors.

A disadvantage of the Lilium Jet™ type aircraft concerns the electric motors which are encased fan type motors. This arrangement is highly energy intensive, resulting in reduced possible flight range for a given battery size.

Furthermore, the encased fans can only be operated for take-off and landing on hardstand surfaces, such as designated landing pads and runways. This limits the usability of the aircraft, and prevents it from being operated during take-off and landing on non-hardstand surfaces, such as parks, fields and gardens. For military applications, this is undesirable, and does not cater for impromptu landings in remote locations.

Another concept VTOL aircraft is the S2 electric™ by Joby Aviation. This design has fixed wings with a plurality of electric motors, preferably four, mounted to each wing. Four additional motors are mounted to the rear stabiliser or tail. A disadvantage of this concept aircraft is that each electric motor is independently actuated, requiring a separate actuator for each motor. As noted above, this requires significant additional weight for the actuation motor system.

Box wing aircraft also referred to as Prandtl's "Best Wing System" are a wing configuration where there is generally an upper and lower wing separated vertically and connected by winglets that form a closed box when viewed from the front. These wings can also be separated horizontally with one configuration with upper wing forward of the lower wing, and the alternate where the lower wing is forward of the upper wing.

The Box wing has a particular advantage in that it reduces the drag due to lift (induced drag), which is dominant at low speeds and high lift coefficients, with a strong relationship between the height of the wings to the span of the wings. Box wings have not been widely adopted due to more complex aeroelastic design requirements and potential complex stall behaviour.

The box wing for VTOL applications has the potential to provide a combination of convenient mounting structure for tilting wings and rotors, coupled with a box wing geometry that reduces the drag due to lift during the high powered transition phase of flight.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a vertical take-off and landing (VTOL) aircraft having:
- a wing structure having right and left side forward wings; and
- right and left side rearward wings, each of the right side wings being connected, and each of the left side wings being connected in a box wing configuration;
- wherein each wing has a fixed leading edge and at least one moveable trailing control surface,
- further wherein each wing has at least one motor pod having a motor, the motor pod being pivotally mounted to an underside of the fixed leading edge, and fixedly secured to the trailing control surface.

The vertical take-off and landing (VTOL) aircraft further preferably comprises a mechanical actuator configured to pivot the motor pod and trailing control surface about a hinge point of the fixed leading edge.

The actuator preferably includes a mechanically driven rotating arm and a linkage.

The rotating arm preferably has a proximal end connected to an actuator motor of the motor pod, and the rotating arm has a distal end connected to a proximal end of the linkage, and a distal end of the linkage is pivotally connected to the fixed leading edge.

The vertical take-off and landing (VTOL) aircraft further preferably comprises a leading edge slot located between the fixed leading edge and the trailing control surface.

The vertical take-off and landing (VTOL) aircraft further preferably comprises an upper slot cover hingedly mounted to an upper side of the fixed leading edge, wherein the upper slot cover generally covers the leading edge slot in a forward flight configuration, and the leading edge slot is at least partially uncovered in a take-off and landing configuration.

The vertical take-off and landing (VTOL) aircraft further preferably comprises a lower slot cover hingedly mounted to an underside of the fixed leading edge, the lower slot cover generally covers the leading edge slot in a forward flight configuration, and the leading edge slot is at least partially uncovered in a take-off and landing configuration.

Preferably a trailing side of the lower slot cover and a trailing side of the upper slot cover are abutment with each other to define an enclosed volume between the fixed leading edge, the upper slot cover and the lower slot cover.

The trailing side of the lower slot cover and the trailing side of the upper slot cover are preferably moveable and configured to slide relative to each other.

The upper slot cover is preferably curved having a concaved surface which is generally downwardly facing in a forward flight configuration.

The lower slot cover is preferably curved having a generally "S" curve profile, having an upwardly facing concave surface adjacent to the leading edge, and a downwardly facing concave surface adjacent to the trailing side in a forward flight configuration.

The upper slot cover is preferably defined by two or more members which are hingedly connected to achieve an articulated connection pivotal about an axis extending generally parallel with a longitudinal axis of the wing.

The upper slot cover is preferably defined by a flexible member and/or connected to the fixed leading edge by a flexible member, the flexible member being fabricated from a material such as a fibreglass composite which is flexible about an axis extending generally parallel with a longitudinal axis of the wing.

Each wing preferably has at least two motor pods having motors, a first motor has rotors having an axis of rotation which is downwardly inclined relative to the control surface, and a second motor has rotors having an axis of rotation which is upwardly inclined relative to the control surface, such that the first and second motors have different thrust lines.

The first and second motors are preferably selectively operable at different rotation speeds to generate a turning moment to rotate the control surface relative to the fixed leading edge.

In a second aspect, the present invention provides a vertical take-off and landing (VTOL) aircraft having:
- a wing structure having right and left side forward mounted wings; and
- right and left side rearward mounted wings, each of the right side wings being connected, and each of the left side wings being connected, to define a box wing structure;
- each wing has a fixed leading edge and at least one moveable trailing control surface, and each wing has a first motor and a second motor, the motors being pivotally mounted to the fixed leading edge, and fixedly secured to the trailing control surface; and
- a mechanical actuator configured to selectively pivot each motor and trailing control surface about a hinge point of the fixed leading edge;
- wherein the first motor has a rotor having an axis of rotation which is downwardly inclined relative to the control surface, and the second motor has a rotor having an axis of rotation which is upwardly inclined relative to the control surface, such that the first and second motors have different thrust lines.

Preferably connecting members join tips of each wing located on the same side of the aircraft, the connecting members each being defined by a first arm secured to the forward wing, a second arm secured to the rearward wing and an intermediate elbow located at a junction of the first and second arms.

Preferably connecting members join tips of each wing located on the same side of the aircraft, the connecting members each having a generally linear body portion extending between the forward wing and the rearward wing.

The first arm of the connecting member preferably defines a pod for storage of batteries, fuel or other equipment.

Preferably the pod is selectively removeable and interchangeable.

The pod is preferably a buoyant float configured for water landing and take-off.

A distal motor is preferably located at or near a tip region of each forward wing, the distal motor being positioned generally in front of the connecting member.

The aircraft preferably has a height to span ratio in the range of:
- 0.14 to 0.3 in a horizontal flight configuration; and
- 0.3 to 0.6 in a vertical flight configuration.

The trailing control surface preferably has a length in profile of between about 50% to about 70% of a total chord length of the wing.

In a third aspect, the present invention provides a method of controlling a vertical take-off and landing (VTOL) aircraft having a wing structure having right and left side forward mounted wings, and right and left side rearward mounted wings, each wing has a first motor and a second motor, the motors each being pivotally mounted to a fixed leading edge, and fixedly secured to a moveable trailing control surface, the first and second motors each having rotors having different thrust lines, the method including the steps of:

mechanically actuating one of the moveable trailing control surfaces to selectively pivot each motor and the trailing control surface about a hinge point of the fixed leading edge; and/or aerodynamically actuating said moveable trailing control surface to selectively pivot each motor and the trailing control surface about the hinge point of the fixed leading edge, wherein the step of aerodynamic actuation includes operating the first and second motors at different rotational speeds.

The mechanical actuation step preferably includes rotating a mechanically driven rotating arm, the rotating arm having a proximal end connected to an actuator motor of one of the first and second motors, and the rotating arm has a distal end connected to a proximal end of the linkage, and a distal end of the linkage is pivotally connected to the fixed leading edge.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Several embodiments of VTOL aircraft 10 are disclosed herein. In common to each embodiment of the aircraft 10, the wing structure is a box wing structure, and the wings 20, 22, 30, 32 are each defined by a fixed leading edge 100, and a moveable trailing control surface 110.

Figure 1:
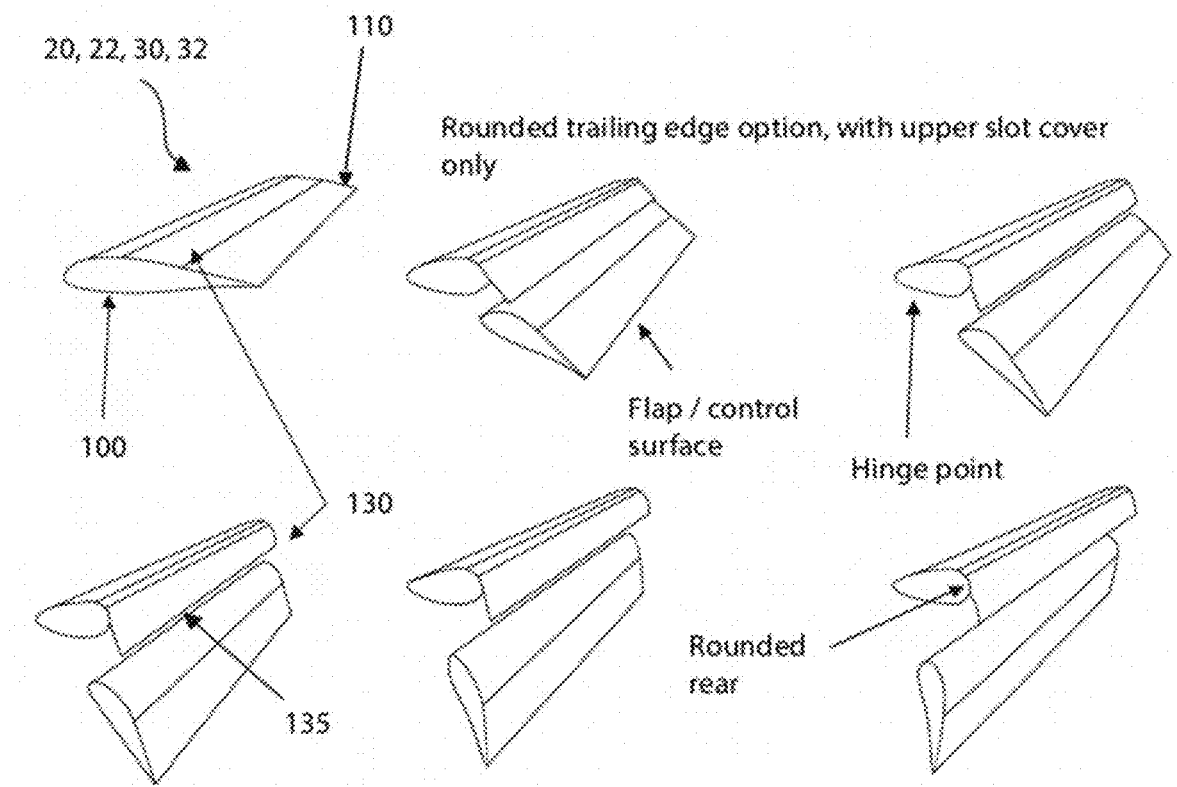
FIG. 1 is a schematic diagram of a wing section of a VTOL aircraft according to a first embodiment.

Referring to FIG. 1, each wing 20, 22, 30, 32 has a fixed leading edge 100 which is secured to the aircraft chassis or another structural component of the fuselage 55. Each fixed leading edge 100 may be a continuous single piece structure which passes through the fuselage 55 to define the structural component of corresponding left and right side wings 20, 22, 30, 32.

The fixed leading edge 100 may be fabricated with differing cross-sectional profiles. For example, referring to FIG. 1, the cross-section of the fixed leading edge has a rounded teardrop like profile, being curved, and having a more acute profile on the upstream side, and a more gently curved profile on the downstream side. However, it will be appreciated that other cross-sections are envisaged, as will be discussed below. Furthermore, the fixed leading edge 100 may be hollow. The fixed leading edge 100 may be fabricated from carbon fibre or another composite material having suitable strength, rigidity and lightness. The fixed leading edge 100 can be manufactured using high volume techniques such as extrusion, composite pultrusion or filament winding as well as using conventional wing construction with aluminium alloys or composites.

Each of the embodiments of the aircraft 10 combines a box wing structure with a wing structure having a moveable control surface/flap 110 that has a length in profile of about 50-70% of the wing chord and a fixed leading edge 100.

Figure 9:
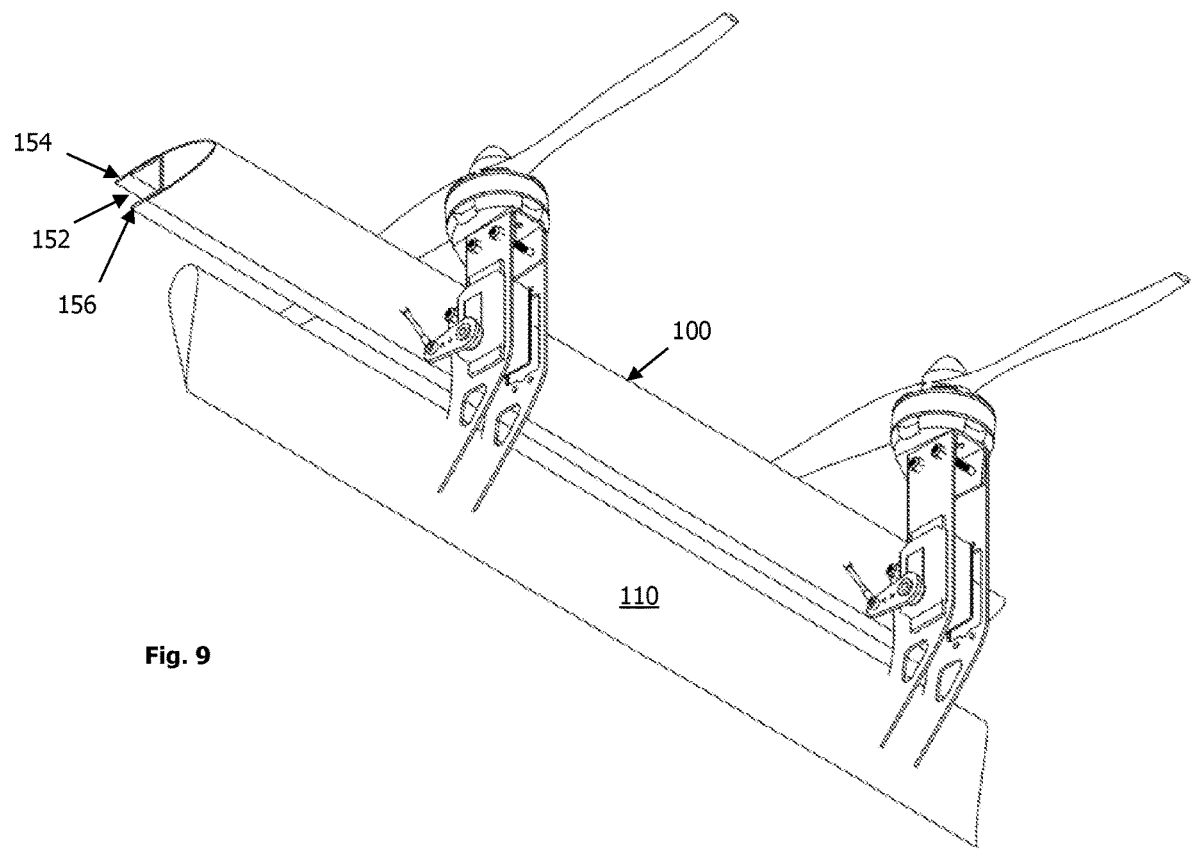
FIG. 9 is a bottom perspective view of a wing section according to a third embodiment having two motors in take-off or landing configuration.

The trailing control surface 110 is moveable relative to the fixed leading edge 100 between a forward flight configuration (for example FIG. 10) and a take-off and landing configuration (for example FIG. 9). Importantly, the fixed leading edge 100 does not rotate or otherwise move relative to the fuselage 55. The control surface 110 is able to rotate through a range of between about 80 and 100 degrees, and preferably approximately 90 degrees between horizontal flight mode (FIG. 11B) and vertical flight mode (FIG. 11A).

The trailing control surface 110 is directly connected to a propulsion pod 195 having a motor 200 and a rotor 70 such that tilting the propulsion pod 195 deflects the trailing control surface or flap 110.

Figures 11A, 11B:
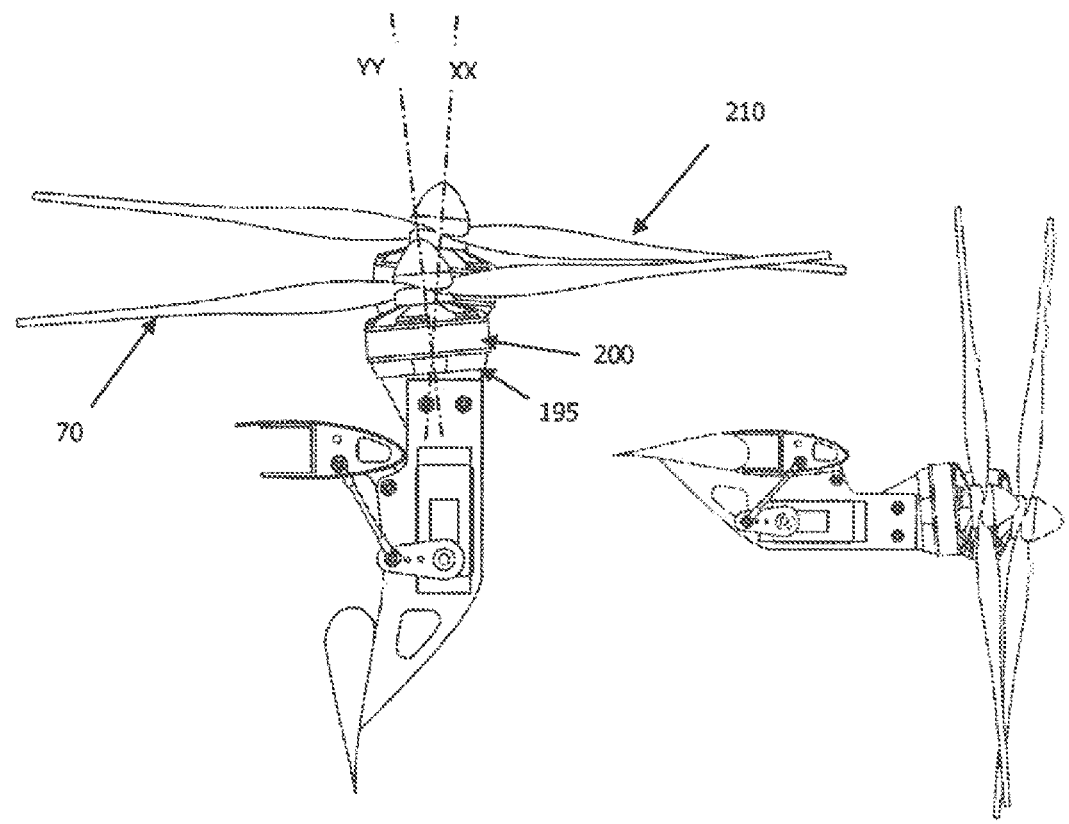
FIG. 11A is a side view of the wing section of FIG. 9 in a first configuration.
FIG. 11B is a side view of the wing section of FIG. 10.

Referring to FIGS. 11A and 11B, the vertical take-off and landing (VTOL) aircraft 10 includes a plurality of motors 200, which may be electric motors or gas powered motors. Each motor 200 has a propeller or rotor 70. The propulsion pod or housing 195 of each motor 200 is mounted adjacent to the lower surface of the moveable control surface 110, generally in front of (upstream) the fixed leading edge 100.

The motors 200 may be mounted sufficiently forward of the fixed leading edge 100 so that the rotor 70 blades can fold rearwardly and remain clear of the wing structure. However, a preferred embodiment uses non-folding rotor blades with a variable pitch mechanism. Fixed pitch blades may alternatively be used.

In some embodiments of the invention, as depicted in FIG. 1, the wing 20, 22, 30, 32 includes an upper slot cover 130. Referring to FIG. 1, a leading edge slot 135, is defined by a gap located between the fixed leading edge 100 and the trailing control surface 110. The leading edge slot 135 increases the coefficient of lift and reduces buffet at high angles of tilt, in descent.

The upper slot cover 130 is mounted to the fixed leading edge 100 with one or more hinges or some other flexible connection, on the upper side of the fixed leading edge 100. As shown in the top left portion of FIG. 1, in a forward flight mode, the slot cover 130 generally covers the clearance defined between the fixed leading edge 100 and the trailing control surface 110, such that the combination of the fixed leading edge 100, the slot cover 130 and the trailing control surface 110 together define a generally continuous aerofoil surface on the upper side of the wing 20, 22, 30, 32.

As the trailing control surface 110 tilts downwardly (FIG. 1 top centre portion), the slot cover 130 also tilts downwardly. The slot cover 130 may be free moving or spring biased. Alternatively, the slot cover 130 may be actuated by a linkage (not shown) connected with the trailing control surface 110. In still further versions, the slot cover 130 may be actuated with a motor or gear train or other actuation mechanism.

The slot cover 130 has a length of between about 10% and 50% of the total wing chord length. In one embodiment the slot cover 130 trailing edge is located behind the point that laminar flow separation occurs in cruising flight. In a further embodiment the slot cover 130 trailing edge has a sawtooth like edge to re-energise and reattach the laminar flow.

Figure 2A:
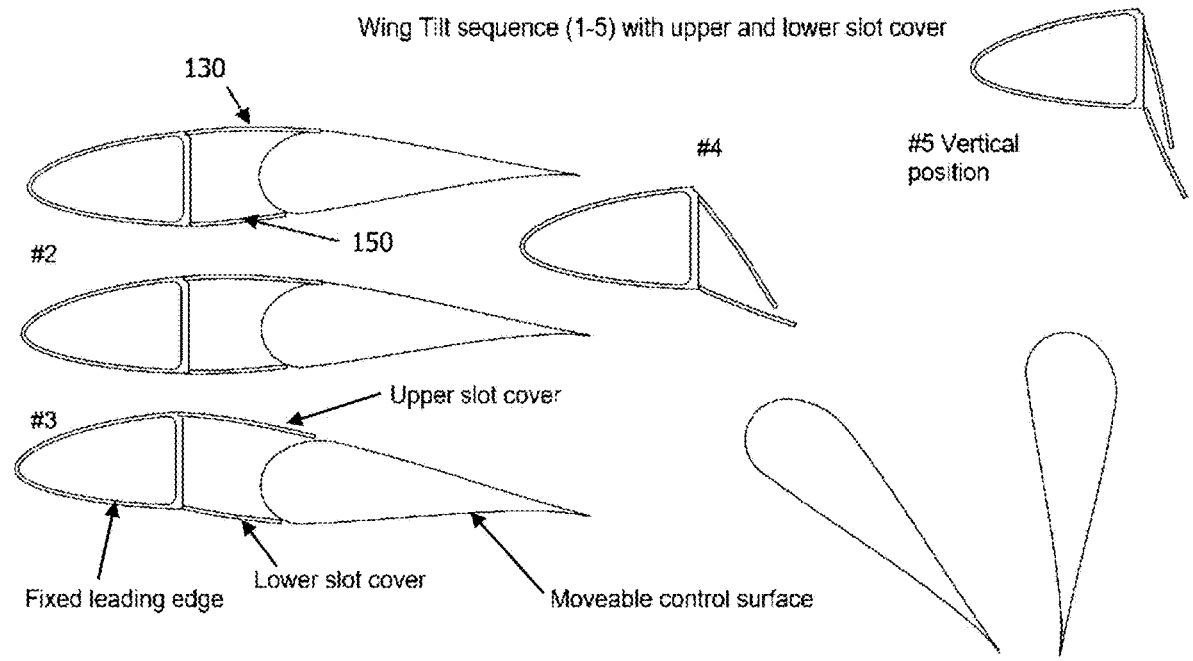
FIG. 2A is a schematic diagram of a wing section of a VTOL aircraft according to a second embodiment.

In the variation depicted in FIG. 2A, there is an upper slot cover 130 and an additional lower slot cover 150. The lower slot cover 150 is also connected by one or more hinges to the fixed leading edge 100. Again, the lower slot cover 150 may be free moving, spring biased or otherwise mechanically actuated.

As shown in the top left portion of FIG. 2A, in a forward flight mode, the upper slot cover 130 and lower slot cover 150 both cover the clearance, or leading edge slot 135 which is defined between the fixed leading edge 100 and the trailing control surface 110, such that the combination of the fixed leading edge 100, the slot covers 130, 150 and the trailing control surface 110 together define generally continuous aerofoil surfaces on both the upper side of the wing and the underside of the wing.

Guide rails may be provided for the slot covers 130, 150 to ensure they are kept in the desired relationship to the control surface 110.

The slot covers 130, 150 reduce drag in cruise flight conditions and guides the airflow when the control surface 110 is deflected to high angles. The fixed leading edge may have a curved or rounded rear such that when the control surface 110 is tilted to near vertical the upper surface is relatively smooth. Alternatively, it may have a relatively straight trailing edge.

Figure 2B:
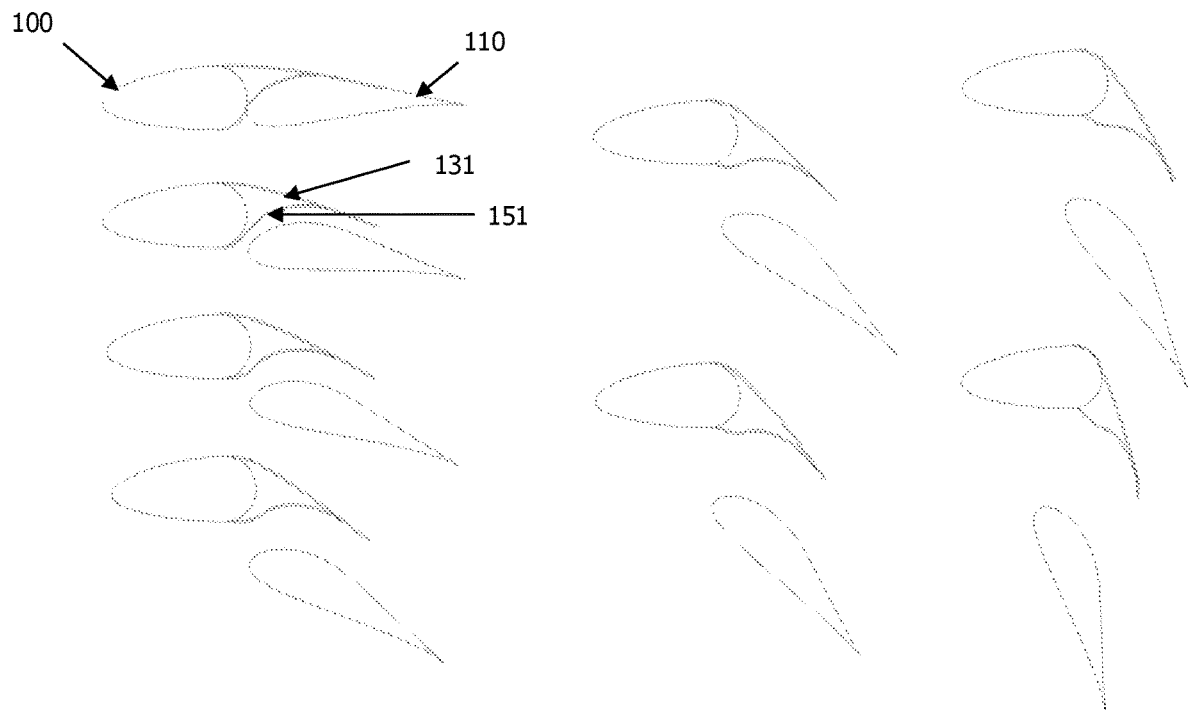
FIG. 2B is a schematic diagram of a wing section of a VTOL aircraft according to a third embodiment.

Referring to FIGS. 2A and 2B, a further embodiment is disclosed in which the upper and lower slot covers 131, 151 are in abutment with each other on the trailing (downstream) side, to define a downstream apex, and an enclosed volume is defined between the fixed leading edge 100, the upper slot cover 131 and the lower slot cover 151. As shown, in this arrangement, the upper slot cover 131 has a downwardly facing concave surface. The lower slot cover 151 has a profile having an "S" curve profile, having an upwardly facing concave surface adjacent to the leading edge, and a downwardly facing concave surface adjacent to the trailing edge.

Figure 2C:
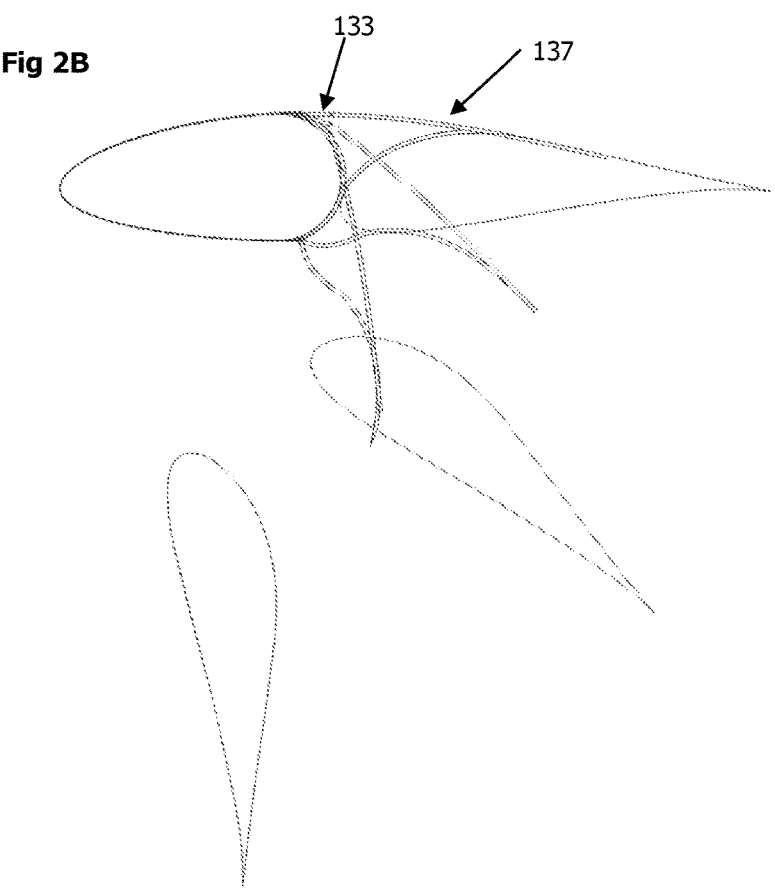
FIG. 2C is a schematic diagram of a wing section of a VTOL aircraft according to a third embodiment.

Referring to FIG. 2C, the upper slot cover 131 may be defined by two or more members 133, 137 which are hingedly connected to achieve an articulated connection, which facilitates the movement of the upper and lower slot covers 131, 151 relative to each other during movement of the trailing control surface 110. Alternatively, upper slot cover 131 may be attached to the fixed leading edge 100 with a hinge that is defined by a flexible section such as a fibreglass composite rather than one or two discrete hinges.

The upper slot cover 131 may be mechanically actuated to provide an upper surface spoiler for control purposes during vertical and horizontal flight.

In this arrangement articulation occurs about an axis extending generally parallel with a longitudinal axis of the wing 20, 22, 30, 32. The downstream edges of the upper and lower slot covers 131, 151 may be connected to each other, but also free to slide relative to each other, for example with a track and slider or other such mechanical connection that enables translation of the downstream edges relative to each other. FIG. 2B, depicts how the downstream edges of the upper and lower slot covers 131, 151 move relative to each other in the different stages of movement of the control surface 110 between forward flight and the take-off and landing configuration.

Figure 10:
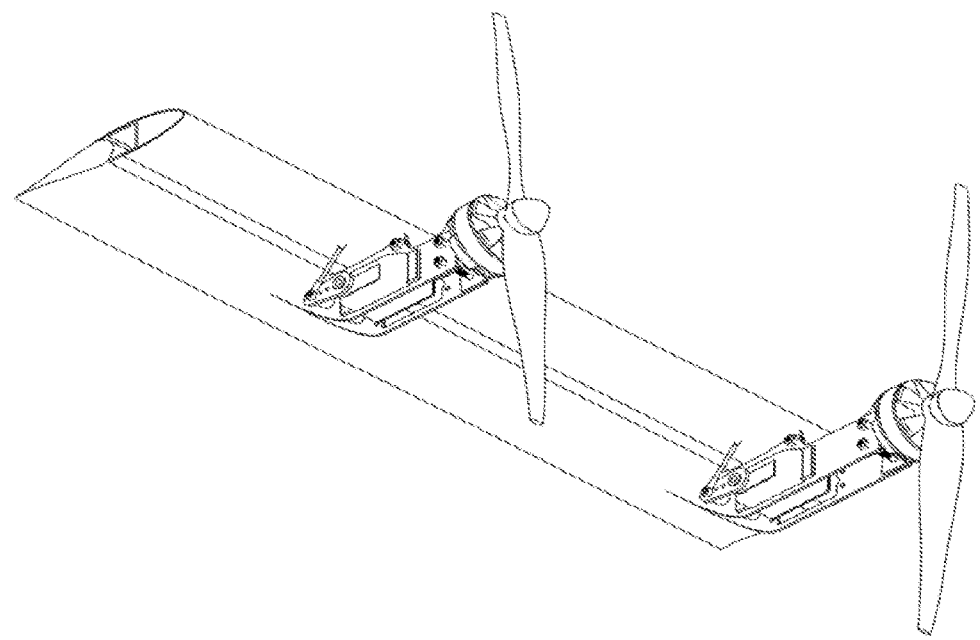
FIG. 10 is a bottom perspective view of the wing section according to FIG. 9, having two motors in a forward flight configuration.

In the embodiment of FIGS. 9 and 10, the downstream side of the fixed leading edge 100 has a channel 152 defined by an upper longitudinally extending projection 154 and an adjacent, lower, longitudinally extending projection 156. The channel 152 can nest the upstream edge of the control surface 110 in the forward flight mode, as depicted in FIG. 10.

Figure 3:
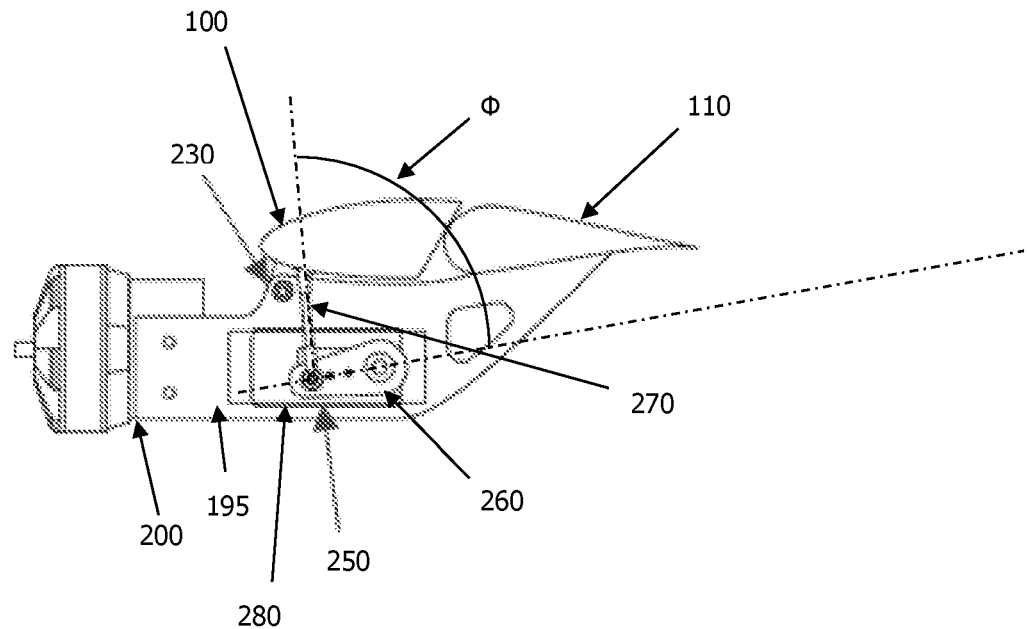
FIG. 3 depicts a motor mounting arrangement for use with the VTOL aircraft wing section of either of the first and second embodiments, with the wing in a forward flight configuration.
Figure 4A:
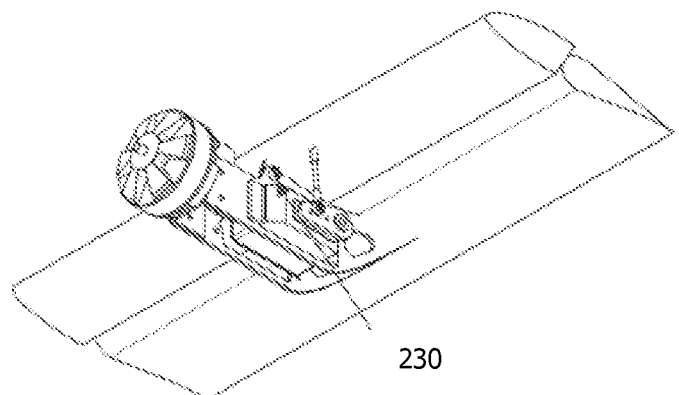
FIG. 4A is a bottom perspective view of the motor mounting arrangement of FIG. 3.
Figure 4B:
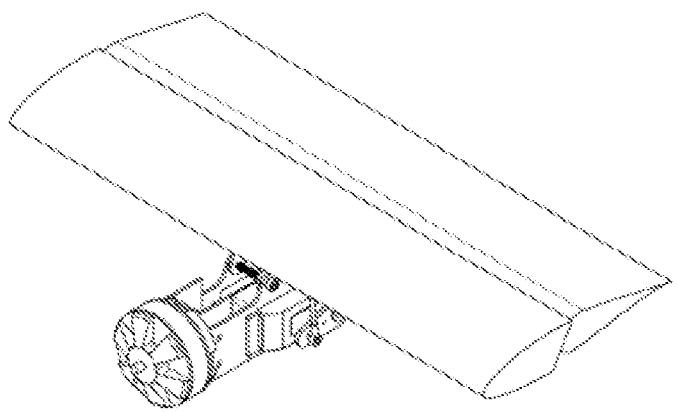
FIG. 4B is a top perspective view of the motor mounting arrangement of FIG. 3.
Figure 6A:
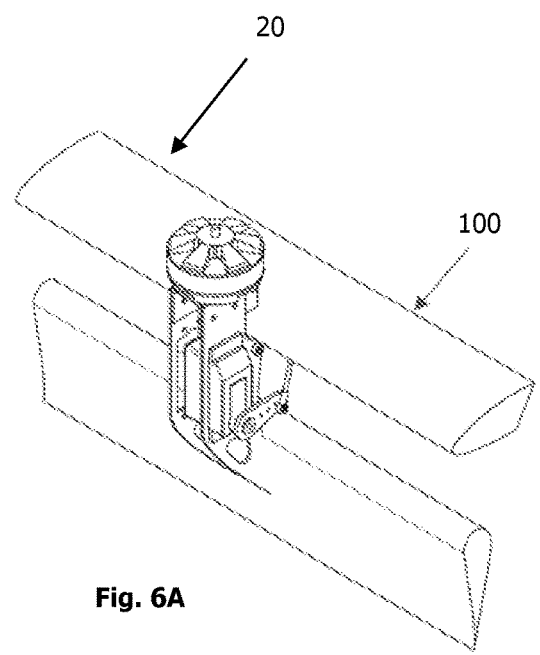
FIG. 6A is a top perspective view of the motor mounting arrangement of FIG. 5.
Figure 6B:
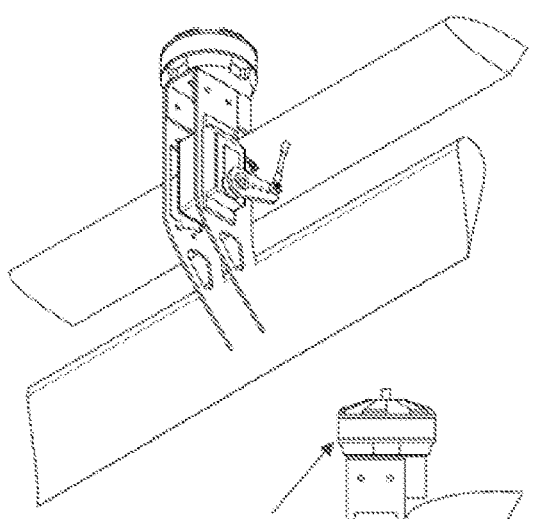
FIG. 6B is a bottom perspective view of the motor mounting arrangement of FIG. 5.

Referring to FIG. 3, each wing includes at least one motor 200. The motor 200 may be an electric motor. Alternatively, the motor may be an internal combustion engine, such as a turboprop or piston engine. In a still further arrangement, the aircraft 10 may have a combination of electric motors and internal combustion engines 200.

Figures 7, 8:
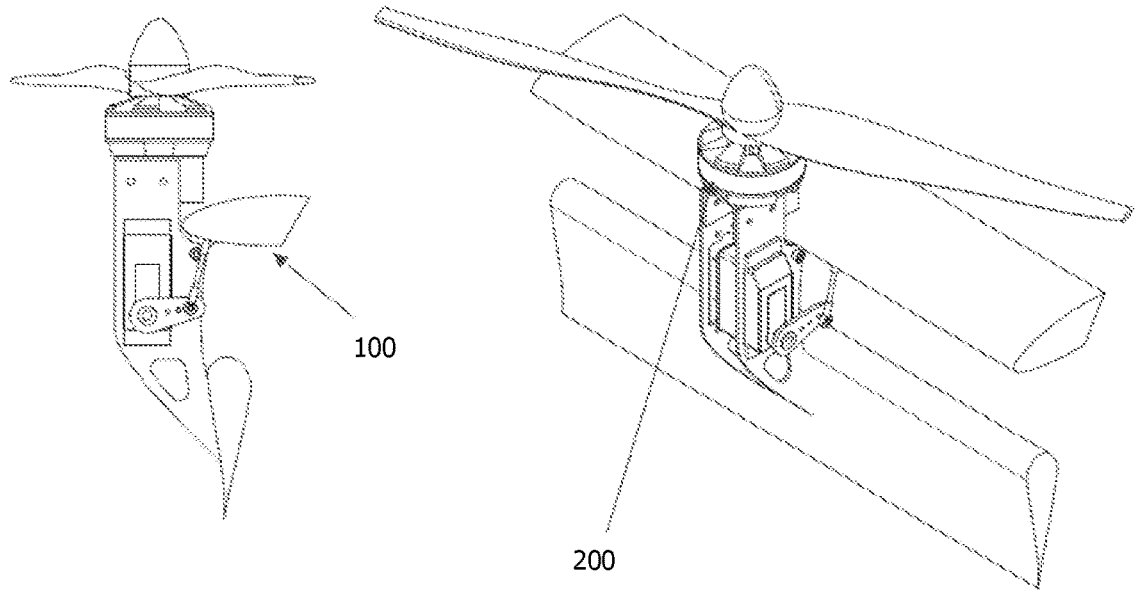
FIG. 7 depicts a motor mounting arrangement for use with the VTOL aircraft wing section of either of the first and second embodiments, with the wing in a take-off or landing configuration, and including propellers.
FIG. 8 is a top perspective view of the motor mounting arrangement of FIG. 7.

The motor pod or housing 195 is mounted to the fixed leading edge 100 at a hinge point 230. The hinge point 230 is defined by a lug or other such projection which extends downwardly away from the underside of the fixed leading edge 100. The motor housing 195 has a proximal end at which the propeller or rotor blades 70 are located (see FIG. 7) and a distal end which is mounted to the trailing control surface 110, in a fixed relationship. As such, the trailing control surface 110 pivots with the motor housing 195. In one embodiment, the hinge mechanism can be integrated into the motor pod or housing 195 structure further reducing structural weight.

The location of the hinge point below and between 10-50% of the chord of the fixed leading edge 100 has the effect of increasing the total wing area and opening up a leading edge slot 135 that operates in a similar fashion to a slotted leading edge. This has the effect of increasing the total lift of the wing 20, 22, 30, 32.

The control system for controlling movement of the trailing control surface 110 is provided in two distinct ways. Firstly, mechanical actuation is provided by an actuator 250, as shown in FIG. 3. The actuator 250 is defined by a mechanically driven, rotating arm 260 and a linkage 270. The linkage 270 is pivotally secured at one end to the rotating arm 260, and also pivotally secured to the fixed leading edge 100. The rotating arm 260 is driven by an electric actuator motor 280 or other such drive system. When the rotating arm 260 is mechanically driven, the angle φ can be selectively changed. For example, in the embodiment depicted in FIG. 3, φ may be approximately 90 degrees, when the trailing control surface 110 is in the forward flight configuration.

Figure 5:
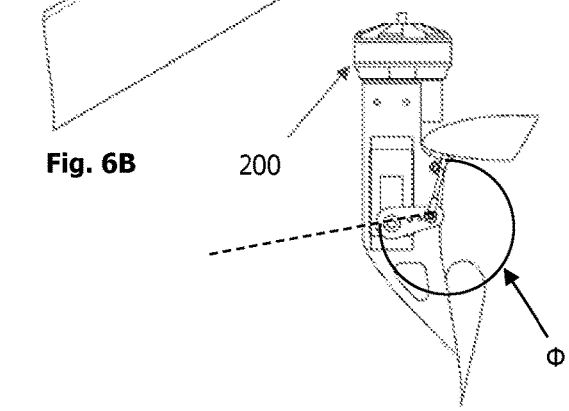
FIG. 5 depicts a motor mounting arrangement for use with the VTOL aircraft wing section of either of the first and second embodiments, with the wing in a take-off or landing configuration.

In contrast, in FIG. 5, the angle has been increased to about 250 to 280 degrees, and in this position, the trailing control surface 110 is in the vertical take-off and landing configuration. The rotating arm 260 is mechanically driven by the actuator 250 to selectively move the trailing control surface 110 between the different flight configurations. It will be appreciated that other linkage 270 angles may be deployed, with different linkage configurations.

The inclusion of integrated actuators in the motor housing 195 permits wing tilt fine control, enabling distribution of weight across the wing, and reduces overall tilt system mass and complexity.

It will be appreciated that whilst one version of the actuator 250 has been described above, other arrangements are envisaged such as a gear train or cam and cam follower arrangements. Some such embodiments of actuation devices are described below.

Figure 29:
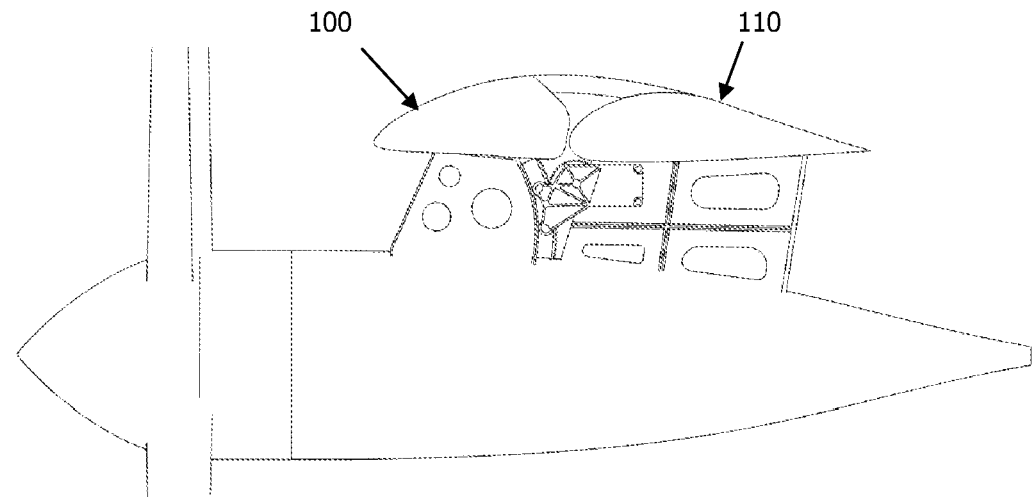
FIGS. 29 and 30 depict a trailing control surface rotation system utilising a curvilinear track mechanism.
Figure 30:
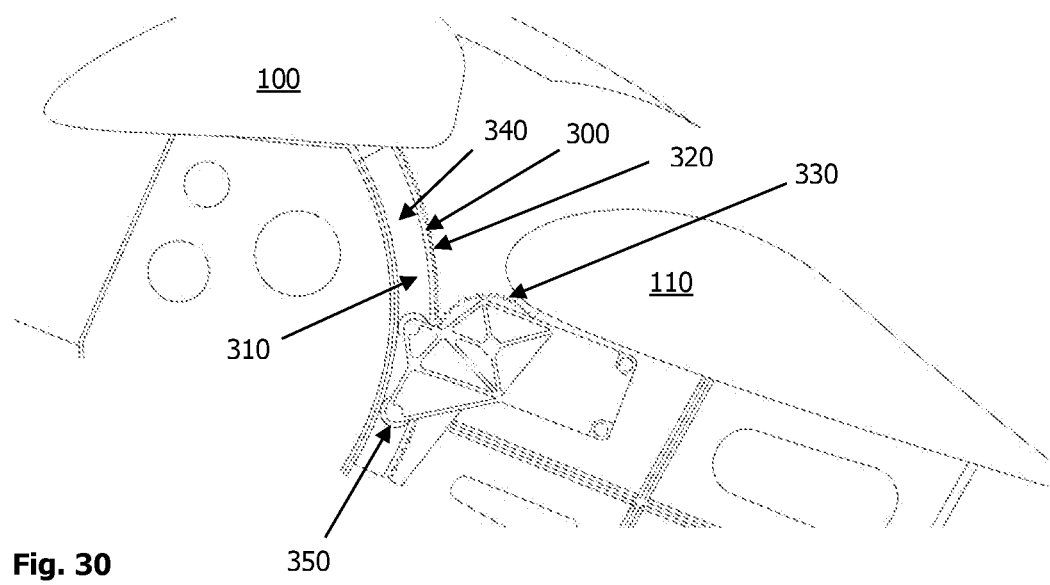

FIGS. 29 and 30 show a hinge rotation system based on a curvilinear track mechanism 300. As depicted in FIG. 30, the track 310 is curved, and provided in the form of a gear rack 320. A gear 330 is in meshing engagement with the gear rack 320, and the gear 330 is mounted on or otherwise secured to the trailing control surface 110 or motor housing. The gear 330 is driven by a rotary actuator which rotates the motor pod and trailing control surface 110. The track mechanism 300 includes a channel 340, and the channel 340 is used to support a pair of roller wheels 350, also mounted to the trailing control surface 110 or motor housing. The roller wheels 350 cause the trailing control surface 110 to follow a curved path when the gear 330 moves along the gear rack 320. The assembly of FIGS. 29 and 30 can utilise mechanised braking to reduce actuator loads when stationary.

Figure 31A:
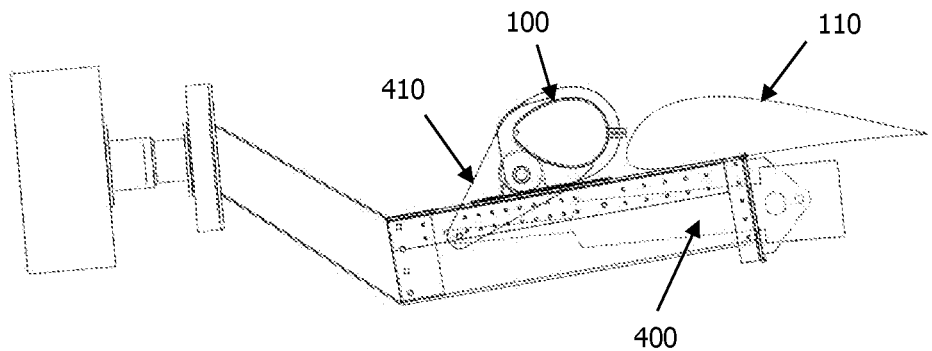
FIGS. 31*a* to 31*c* show a trailing control surface rotation system based on a linear actuator, in different stages of rotation.
Figure 31B:
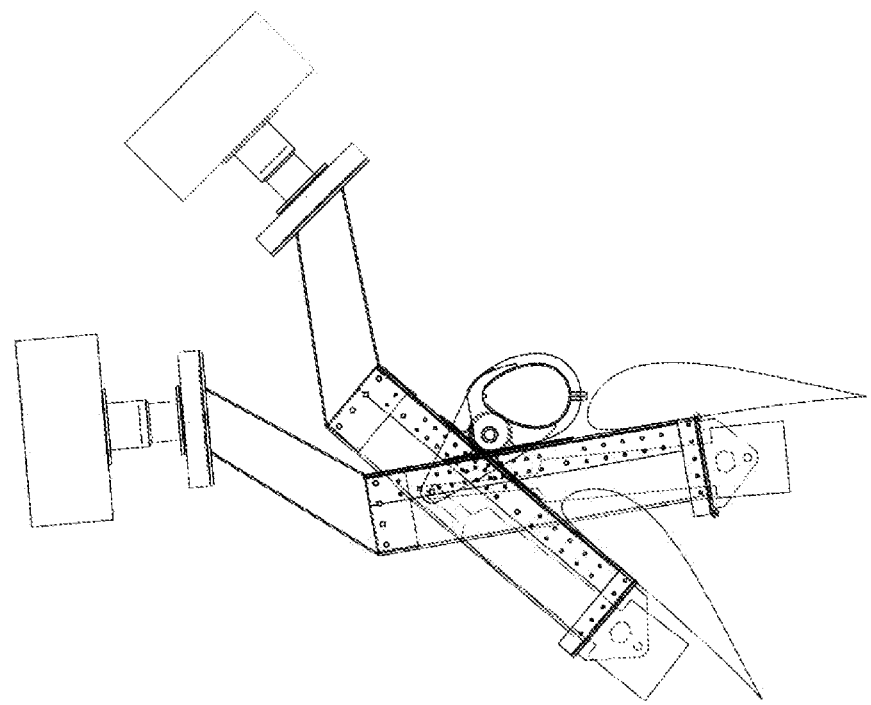
Figure 31C:
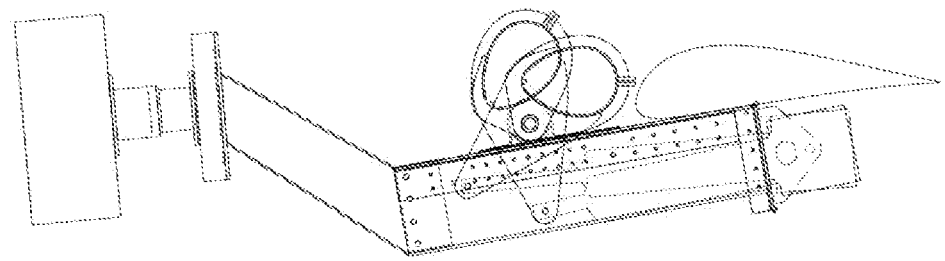

A further embodiment of a linear actuator 400 is depicted in FIGS. 31a to 31c. The linear actuator 400, such as a hydraulic or pneumatic cylinder, is attached to a lever 410, which is fixed to the leading edge 100. The linear actuator 400 drives the trailing control surface 110. This arrangement provides a compact motor-pod assembly and reduces moments from the actuator on the motor-pod assembly.

Figure 32:
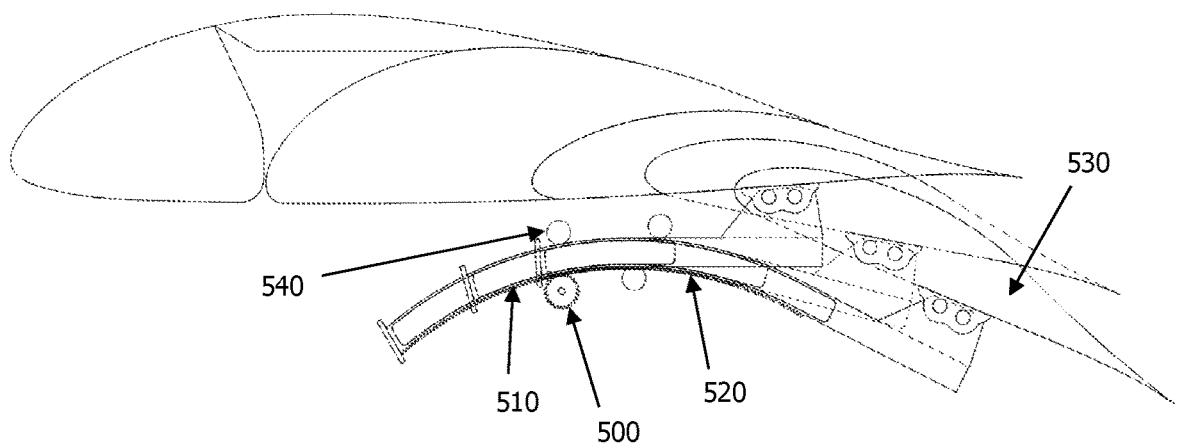
FIG. 32 depicts a secondary control surface actuated by a single track system.
Figure 33:
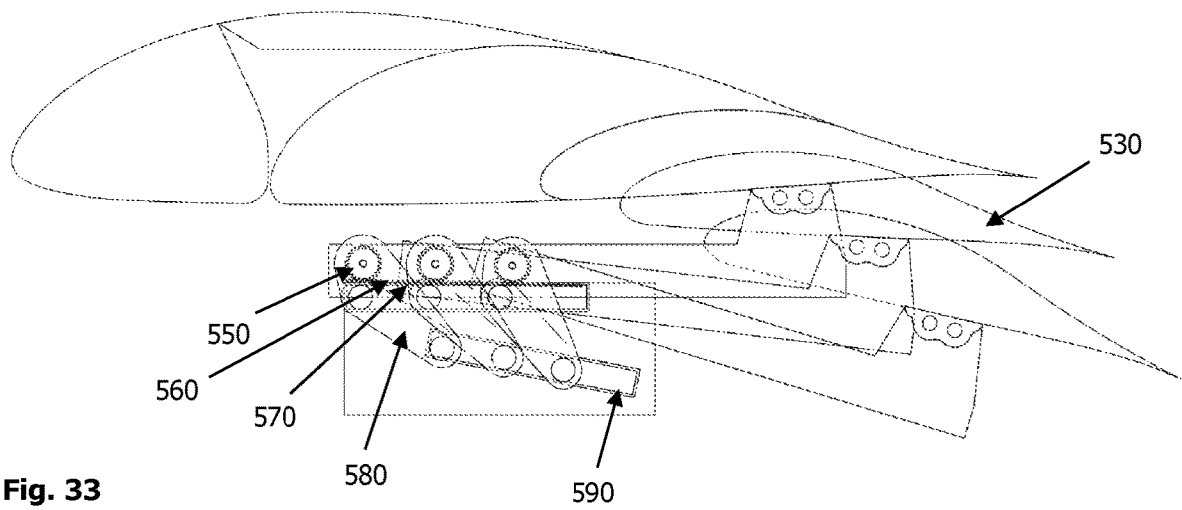
FIG. 33 depicts a secondary control surface actuated by a double track system.
Figure 34:
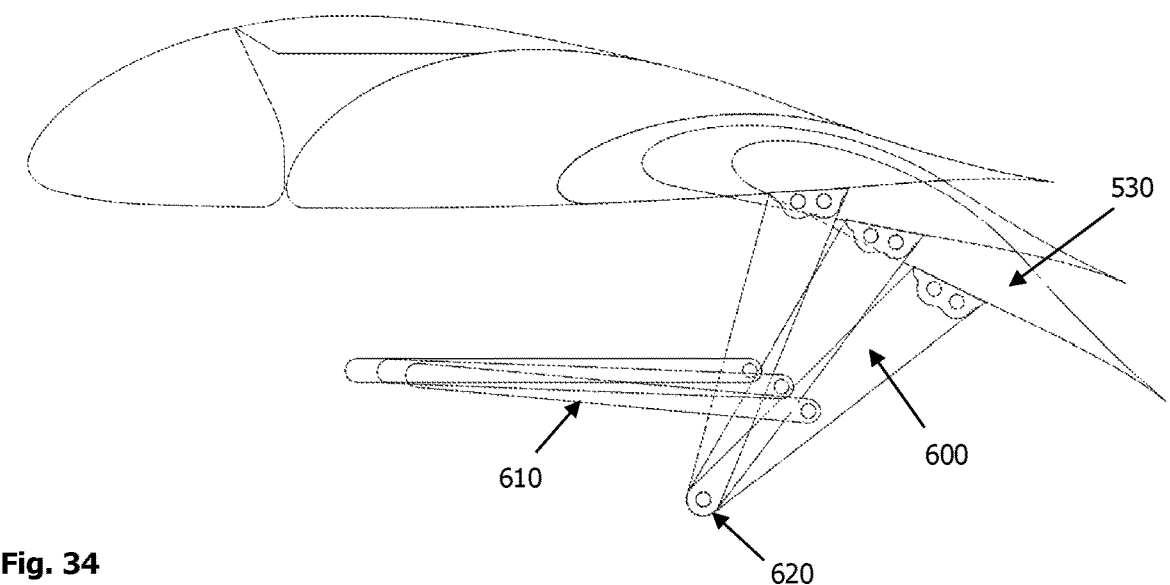
FIG. 34 depicts a secondary control surface actuated by a hinged link.

FIGS. 32 to 34 disclose an actuated secondary control surface 530, shown schematically in different positions. This secondary control surface 530 is used to expand the effective wing area to maximise lift during transition flight. It is used to deflect flow to maximise lift during transition flight, and is retracted during cruise flight to reduce drag to maximise lift efficiency.

In the embodiment of FIG. 32, a rotary actuator rotates a gear 500 which meshes with a rack 510 connected to a curvilinear track 520. The secondary control surface 530 is attached to the track by a set of rollers 540. This mechanism allows the secondary control surface 530 to rotate around a large effective hinge location.

This allows larger translation motion during deployment to maximise effective wing area.

FIG. 33 discloses an embodiment of a double track assembly for controlling the secondary control surface 530. Specifically, in this embodiment, a rotary actuator rotates a gear 550 which meshes with a rack 560 on a first track 570. The translation of the secondary trailing control surface 530 is defined by the first track 570. A fixed link 580 is connected to a second track 590, defining the angle of the secondary trailing control surface 530. This arrangement allows optimised position and angle for the secondary trailing control surface 530 at any point during deployment.

In an alternative embodiment, FIG. 34 discloses a hinged link assembly consisting of a rotated arm 600 and a lever arm 610 for controlling the secondary trailing control surface 530. In this embodiment, the secondary trailing control surface 530 is fixed to the rotated arm 600, which pivots about the fixed pin 620, and the lever arm 610 drives the rotation of the secondary trailing control surface 530.

Figure 35:
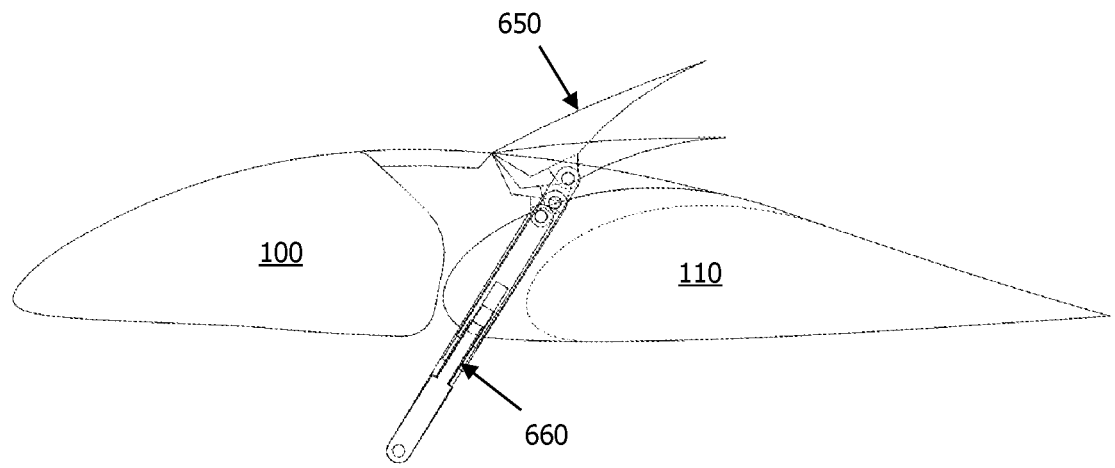
FIG. 35 depicts a control mechanism for an upper slot cover during cruise flight.

FIG. 35 discloses a spoiler, or upper slot cover 650, which can be mechanically driven, either by a linear or rotary actuator 660. During cruise flight, the upper slot cover 650 can be used to spoil lift. Alternatively, it can be used for direct lift control and for flight control (roll pitch) in cruise flight.

Figure 36:
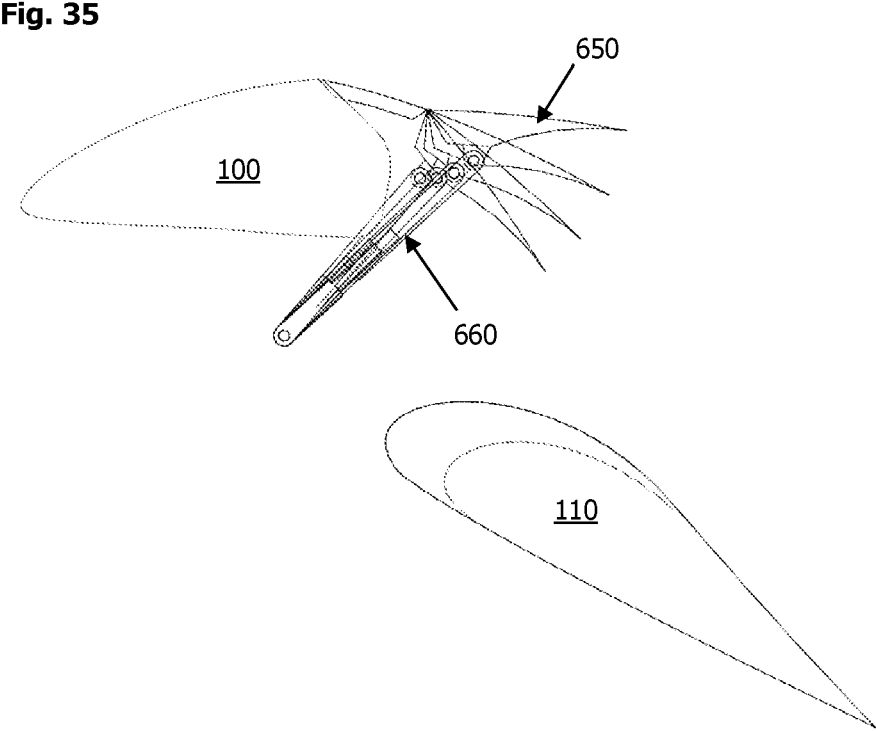
FIG. 36 depicts the control mechanism of FIG. 35 during transition flight.

In contrast, during transition flight, as depicted in FIG. 36, the upper slot cover 650 can be used to spoil lift. The upper slot cover 650 can also be used to increase lift during transition flight. The upper slot cover 650 can also be used to alleviate gust effects during transition flight.

In addition to the mechanical actuation provided by the actuator 250, aerodynamic actuation is also provided to move the control surface 110, as discussed below.

Referring to FIGS. 11A and 11B, the axes of rotation of the motors 200 are non-parallel. In particular, for each pair of motors 200, each odd motor 200 has an axis of rotation XX which is downwardly inclined relative to the control surface 110, and each even motor 60 has an axis of rotation YY which is upwardly inclined relative to the control surface 110. That is, each motor 200 is mounted having different thrust lines (see FIG. 37). In this manner, one of the motors 200 has a thrust line that tends to rotate the control surface 110 clockwise, and the other motor has a thrust line that tends to rotate the control surface 110 counter-clockwise. When the pair of motors 200 operate in unison, at a similar rotational speed, the moments cancel out, and stabilisation is achieved in the vertical flight mode.

By rotating each motor 200 from each pair of motors 200 at different rotations speeds, a turning moment can generate a moment about the hinge point 230, to selectively pivot the control surface 110 relative to the fixed leading edge 100. This is referred to herein as aerodynamic actuation of the control surface 110.

This provides aerodynamic control for the control surface 110. The power to move the control surface 110 is derived by a combination of one or more of the mechanical actuation and the aerodynamic actuation. This may vary depending on the flight mode.

The control surface 110 may be a single surface which extends continuously along the full length of the wing 20, 22, 30, 32. Alternatively, each wing 20, 22, 30, 32 may have one or more independently pivotal control surfaces 110, such that the control surfaces 110 are capable of pivoting about the leading edge 100, independent of the other control surfaces 110.

There are two possible mounting arrangements for the motors 200 and control surfaces 110:
a) Each motors 200 may be pivotally connected to one of the fixed leading edges 100, and the control surface 110 is secured to the motor pod or housing 195 of the motor 200 (as depicted in the drawings); or
b) The control surface 110 may be pivotally connected to one of the fixed leading edges 100, and the control surface is secured to the motor pod or housing 195 of the motor 200.

The aircraft 10 can provide a separately regulated power supply to each motor 200. This permits a different voltage and/or frequency to be delivered to each motor, and hence variable power output can selectively be generated by each motor 60 to achieve desired flight conditions such as turning left and right, and the aforementioned aerodynamic control surface 110 actuation.

The fixed leading edge 100 forms a continuous structure from the forward wings 20, 22 to the rearward wings 30, 32 on account of the connection of the wing tips via the connecting members or webs 42. This structural connection provides sufficient rigidity that it enables the design of different fuselage 55 configurations, with the potential of using one standard wing configuration for several very different fuselage 55 configurations.

This continuous structure provides sufficient stiffness and rigidly such that the aircraft 10 can sustain any single engine failure without detrimental elastic deformation. The structure can be designed so that it does not rely on the fuselage 55 stiffness to the extent that the fuselage 55 structural weight can be reduced.

In the embodiments depicted in the drawings, there are two pairs of wings. Namely, the forward wings 20, 22 and the rearward wings 30, 32. Each of the forward wings 20, 22 is attached to (or extends through) a laterally opposing region of the fuselage 200. Similarly, each of the rearward wings 30, 32 is attached to (or extends through) a laterally opposing region of the fuselage 55. In the embodiments shown in the drawings, the aircraft 10 is depicted as a single seat or double seat aircraft 10. However, larger multi-person embodiments are also envisaged. The aircraft 10 may be controlled from within by a pilot, or alternatively it may be remotely controlled.

Figure 21:
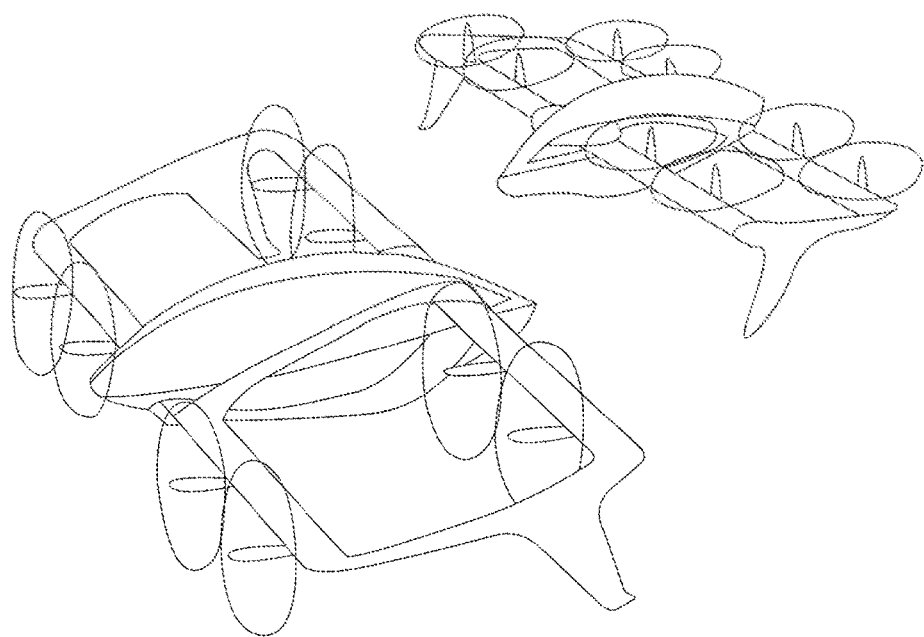
FIG. 21 is a front and rear perspective view of the VTOL aircraft according to a fifth embodiment.

In the embodiment shown in the drawings, distal portions of the forward wings 20, 22 and the rearward wings 30, 32 are connected with connecting members or webs 42, such that the two pairs of wings 20, 22, 30, 32 define a boxed wing or closed wing structure. That is, there is a connecting member 42 at the wing tips between the front 20, 22 wings and rear wings 30, 32 and when viewed from the top and the front it has an enclosed profile. In some embodiments, such as FIGS. 12 and 21, the connecting member 42 may be a generally straight member. In contrast, in the embodiment of FIGS. 13 to 20 and 22, the connecting member 42 is non-linear.

In another embodiment (not shown), the forward wings 20, 22 and the rearward wings 30, 32 may be strut braced wings, connected with tie bars or struts.

Whilst the VTOL aircraft 10 described herein is a boxed wing or strut braced aircraft 10, it will be appreciated by those skilled in the art that the aircraft 10 may be a conventional cantilevered wing aircraft in which the forward wings 20, 22 and the rearward wings 30, 32 are separate and not interconnected. Furthermore, the aircraft 10 may have only a single pair of wings.

Figure 17:
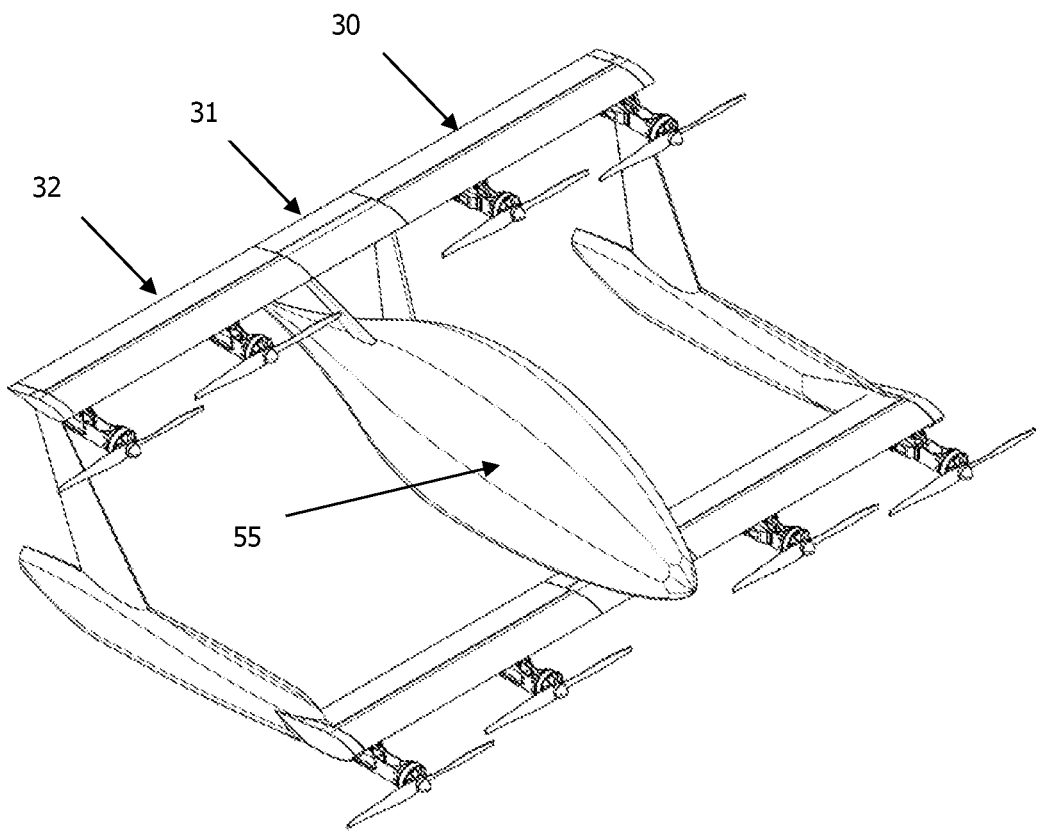
FIG. 17 is a perspective view of a box wing VTOL aircraft according to a fourth embodiment of the invention, in a forward flight configuration.
Figure 18:
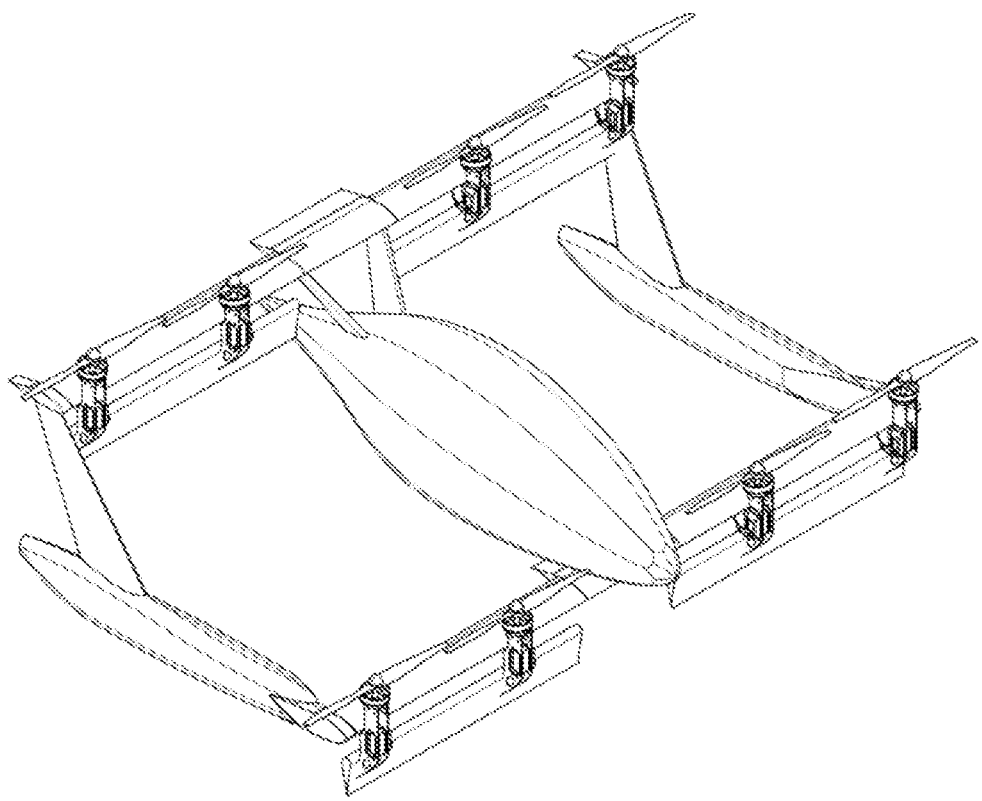
FIG. 18 depicts the box wing VTOL aircraft according to FIG. 17, in a take-off and landing flight configuration.
Figure 19:
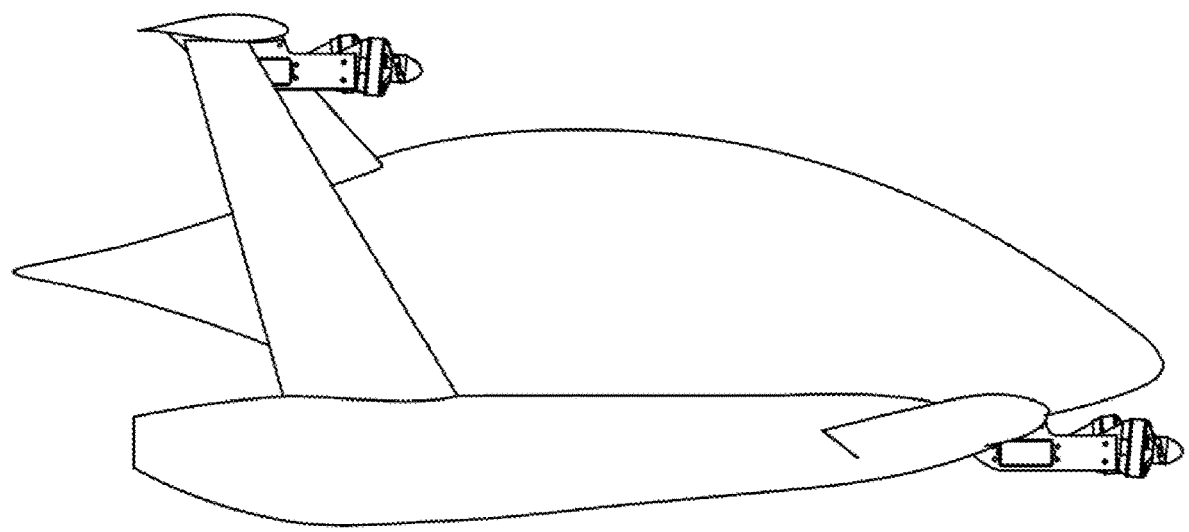
FIG. 19 is a side view of the box wing VTOL aircraft of FIG. 17.
Figure 20:
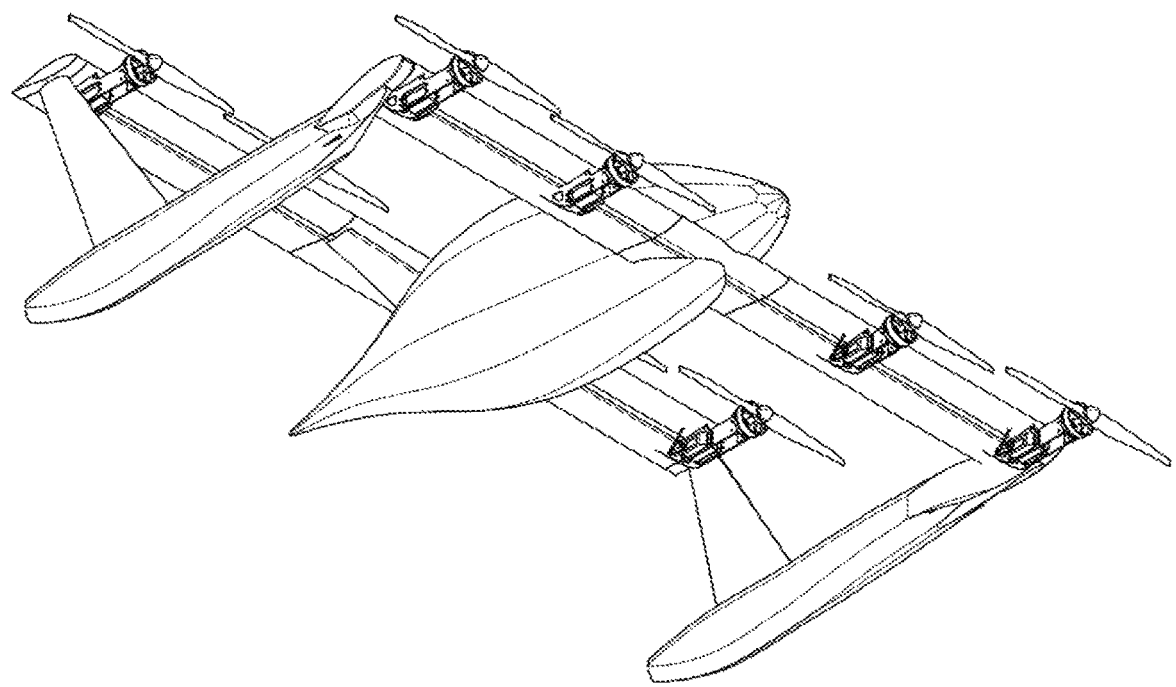
FIG. 20 is a bottom perspective view of the VTOL aircraft of FIG. 17.

In the embodiment depicted in FIGS. 17 and 18, the rear wings 30, 32 are located above the fuselage 55, meaning that the length of the rear wings 30, 32 is increased, and hence the available lift which can be generated in forward flight mode is increased. A central portion 31 of the rear wing span is fixed, and does not include a moveable control surface.

The forward wings 20, 22 and the rearward wings 30, 32 are vertically separated, such that the forward wings 20, 22 are vertically positioned below the rearward wings 30, 32. In particular, the forward wings 20, 22 are positioned below and in front of the rearward wings 30, 32. This provides several advantages and ensures that the wing location provides an efficient mounting for the vertical lift and propulsion motor 200 and rotor 70 combination.

As depicted in FIGS. 23 to 26 having the forward wings 20, 22 low (and rearward wings 30, 32 high) means that the height to span ratio increases as the rotors rotate from horizontal to vertical. Box wings with a higher height to span ratio have a lower induced drag which can be utilised effectively for VTOL aircraft. The height to span ratio is in the range of:
0.14 to 0.3 in a horizontal flight configuration; and
0.3 to 0.6 in a vertical flight configuration.

Figure 12:
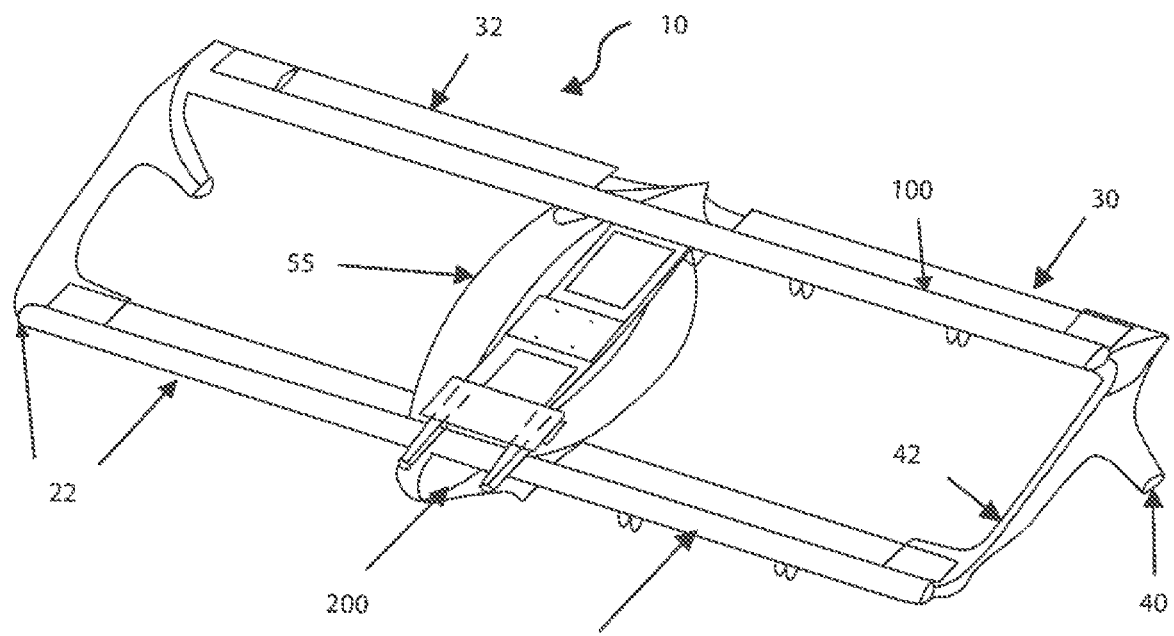
FIG. 12 is a perspective view of a box wing VTOL aircraft according to a first embodiment of the invention.
Figure 13:
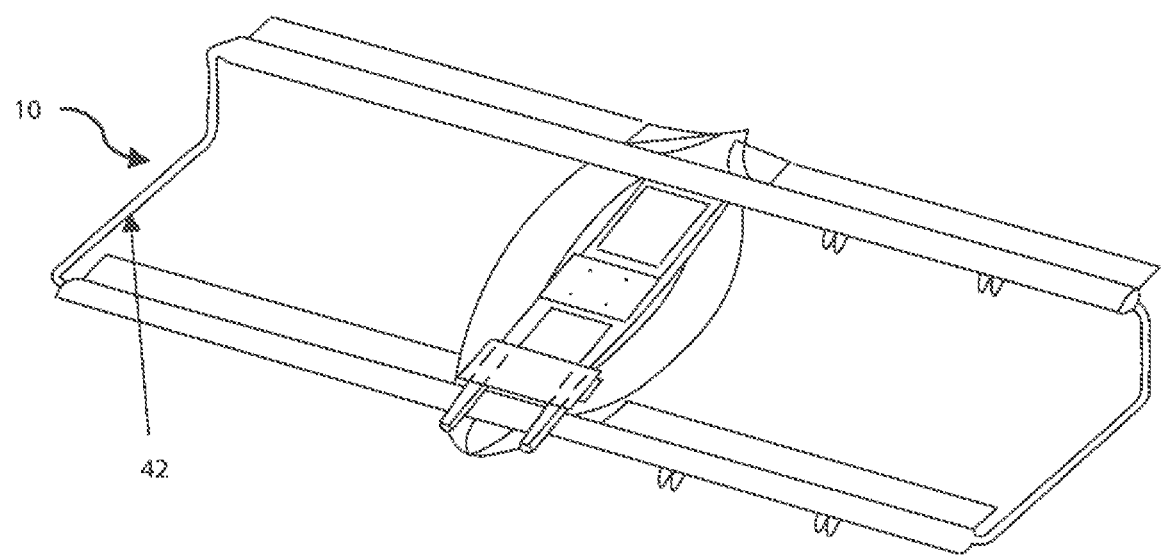
FIG. 13 is a perspective view of a box wing VTOL aircraft according to a second embodiment of the invention.

As depicted in the embodiment of FIG. 12, the tip portion 40 of the rearward wings 30, 32 extends downwardly and rearwardly. This wing tip portion, or winglet 40, assists to reduce wing tip vortices. The winglets 40 may include one or more wheels for supporting the aircraft 10 when stationary, and during take-off and landing. The aircraft 10 of FIG. 12 also has a further wheel or set of wheels which are located beneath the fuselage 55, generally near the front of the fuselage 55. In this way, the rear wheels and front wheels are positioned at the vertices of an isosceles triangle. By locating the rear wheels on the winglets 40, the width of the aforementioned isosceles triangle is maximised, thereby increasing the stability of the aircraft 10.

Figure 37:
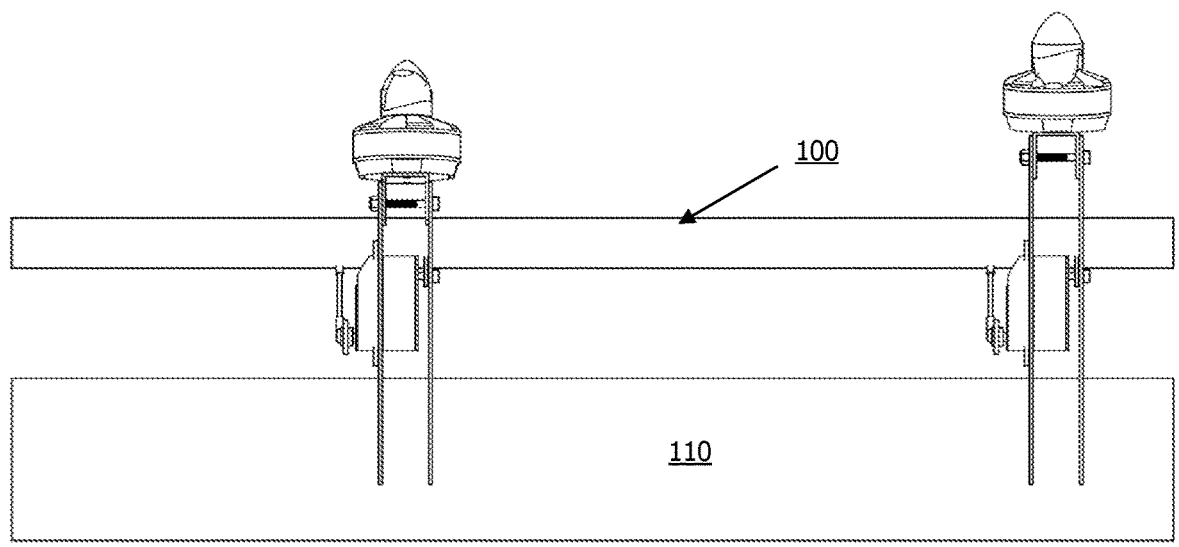
FIG. 37 is a front view of a wing in the take-off/landing configuration.

In the embodiment depicted in FIGS. 9 and 10 and 37, at least one of the wings 20, 22, 30, 32 has a first and a second motor 200 which are longitudinally offset relative to each other about an axis of rotation of the rotors 210.

The wing adjustment, depicted in FIGS. 9 and 10, shows the change of inclination of the motors 200 and control surface 110 when transitioning between the take-off wing position (FIG. 9) and the forward flight wing position (FIG. 10). As shown in those figures, the leading edges 100 are stationary, and non-pivoting. In contrast, the motors 200 and control surfaces 110 pivot in unison.

Referring to FIG. 3, when the control surface 110 reaches the final, horizontal position, for forward flight, engagement may occur between the fixed leading edge 100 and the control surfaces 110 to prevent the control surface 110 from pivoting further. Alternatively, the motor pod or housing 195 may engage with the underside of the fixed leading edge 100.

In the embodiments depicted in FIGS. 14 to 21, there are two motors 200 mounted to each wing 20, 22, 30, 32. However, additional motors 200 may be mounted to the aircraft 10, for example on the wings 20, 22, 30, 32, the nose of the fuselage 55 or the wing connecting members 42.

By employing lower numbers of motors 200, the rotor 210 diameter can be increased. The rotor blade 70 diameters may overlap with adjacent rotor 70 blades when viewed from the front. In order to accommodate the overlap, the motors 60 are mounted such that each set of rotor blades 70 is longitudinally offset relative to the adjacent set of rotor blades (relative to an axis of rotation), thereby preventing contact between the adjacent rotors 70, whilst permitting large diameter rotors to be deployed.

Figure 14:
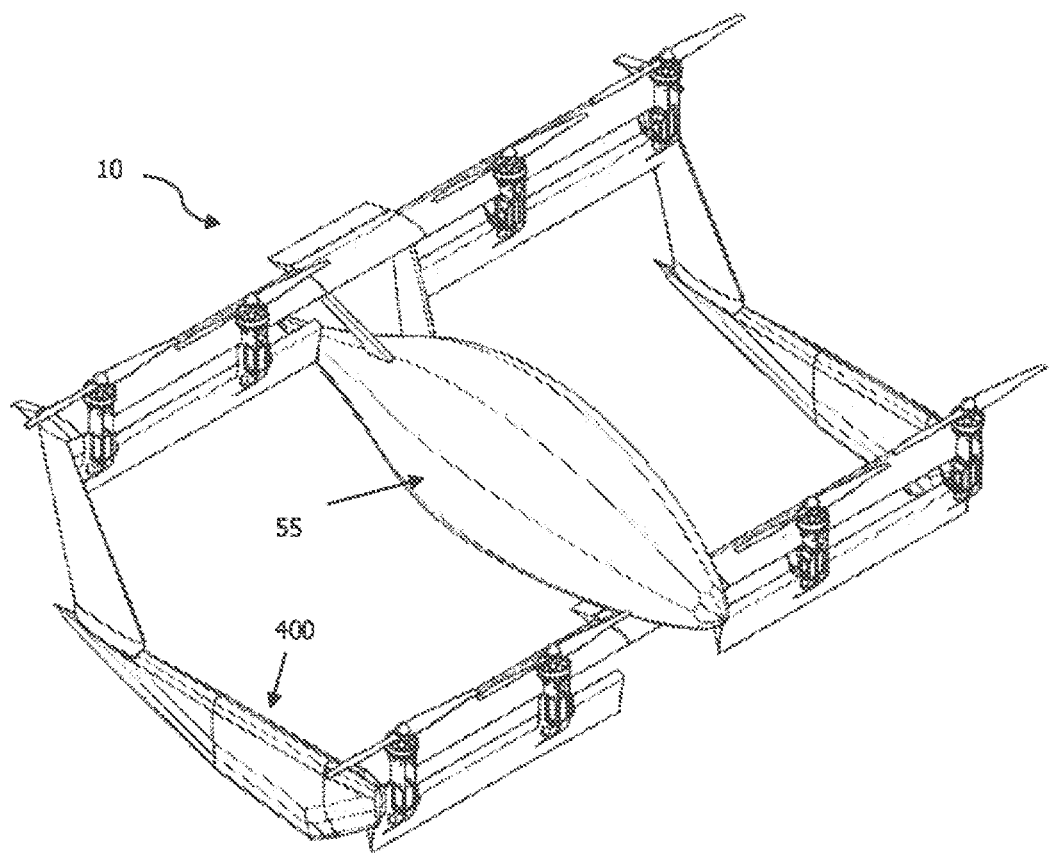
FIG. 14 is a perspective view of a box wing VTOL aircraft according to a third embodiment of the invention for landing on water.
Figure 15:
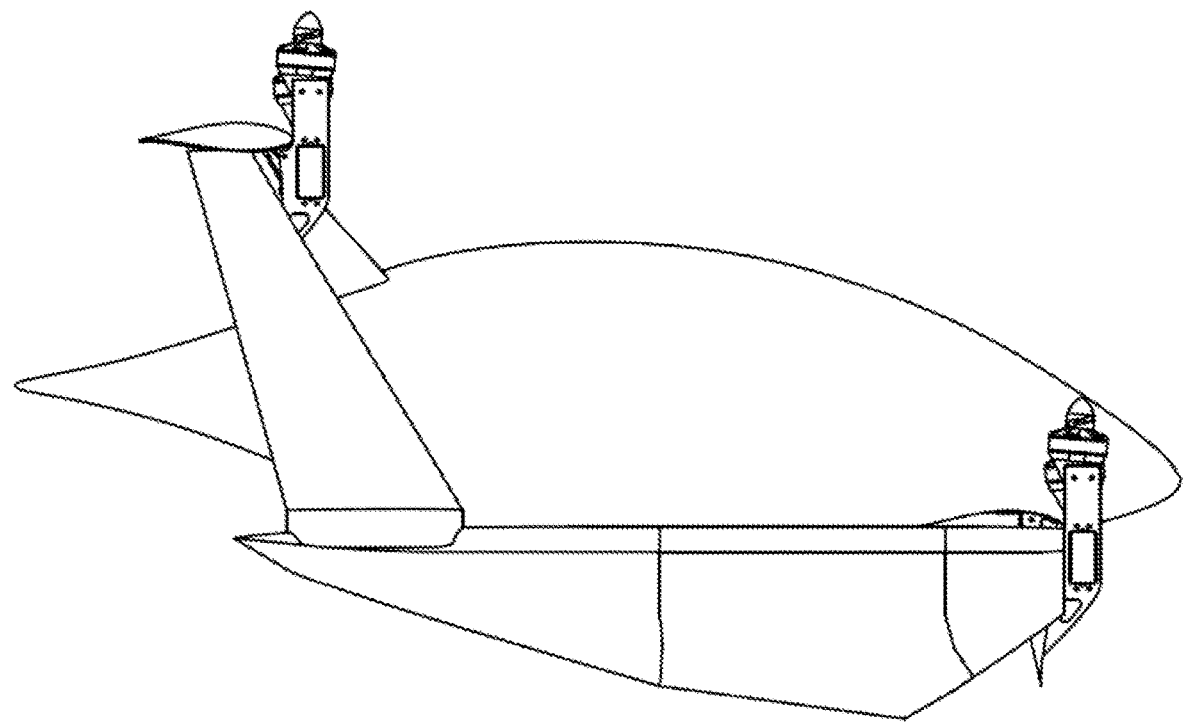
FIG. 15 is a side view of the box wing VTOL aircraft of FIG. 14.
Figure 16:
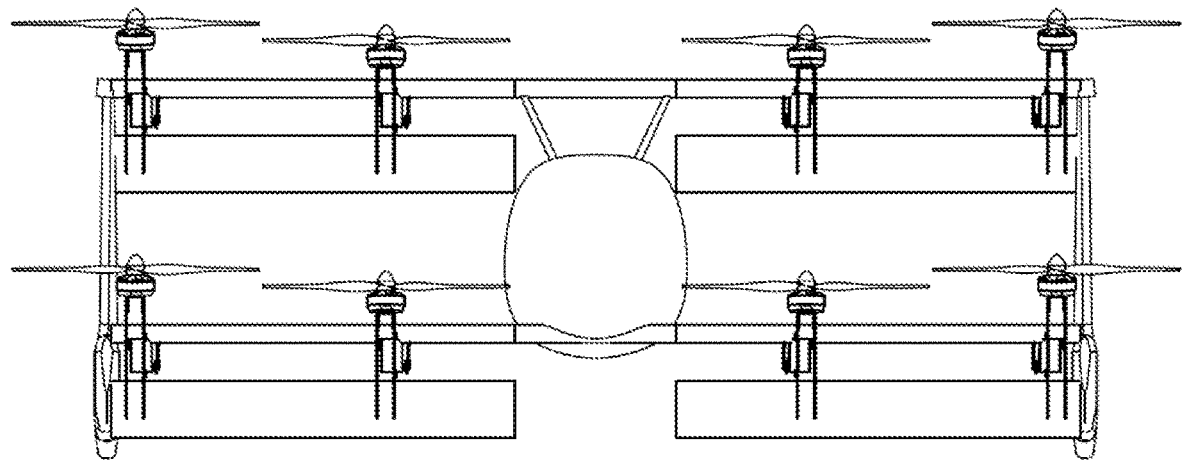
FIG. 16 is a front view of the box wing VTOL aircraft of FIG. 14.

Referring to FIGS. 14 to 16, an embodiment of the aircraft is depicted for possible water landing and take-off applications, for example in the form of a military aircraft 10 for deployment at sea. In these embodiments, the pads 400 have the potential to allow water landings, by acting as stabilising floats. This may be useful for some applications for normal water landings and emergencies. In particular applications where landing on the water is useful such as picking up and dropping off people, areas where water is the best landing site or for roles where picking up and dropping of equipment or people from the water or deploying sensors or equipment such as dipping sonar.

In these embodiments, the landing pads 400 may be used to house energy storage systems that may include more batteries, fuel cells, such as hydrogen fuel cells, with hydrogen fuel tanks, and turbogenerators with fuel tanks.

Figure 22:
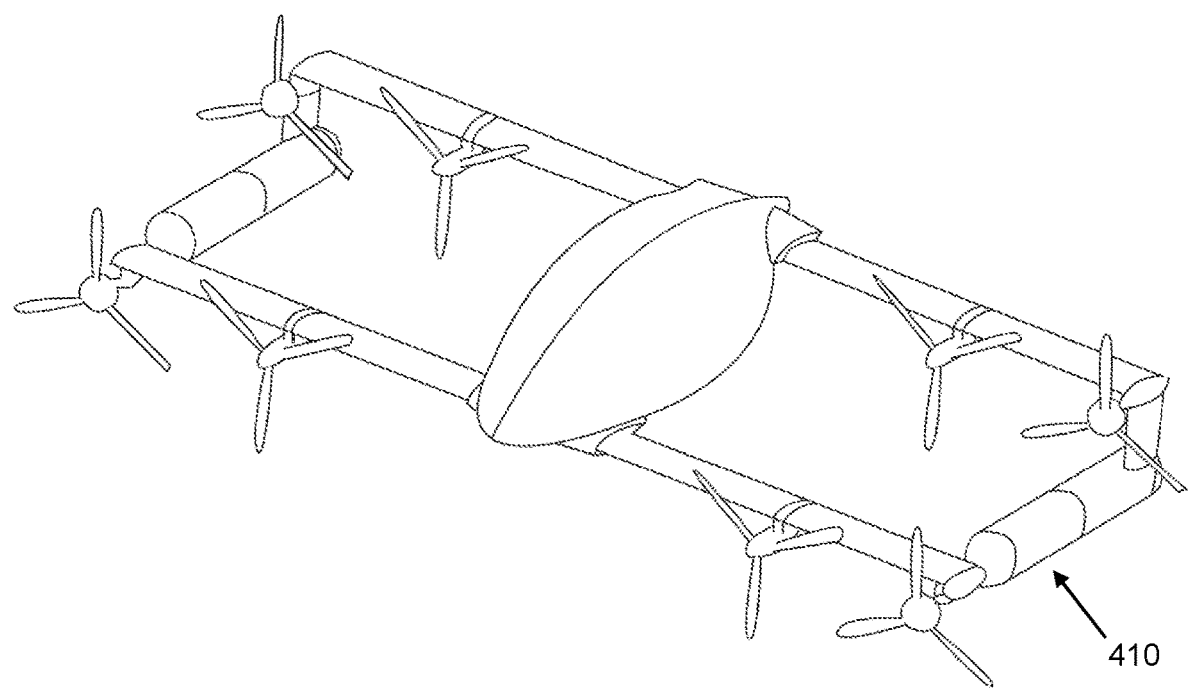
FIG. 22 is a perspective view of a VTOL aircraft according to a sixth embodiment.
Figure 23:
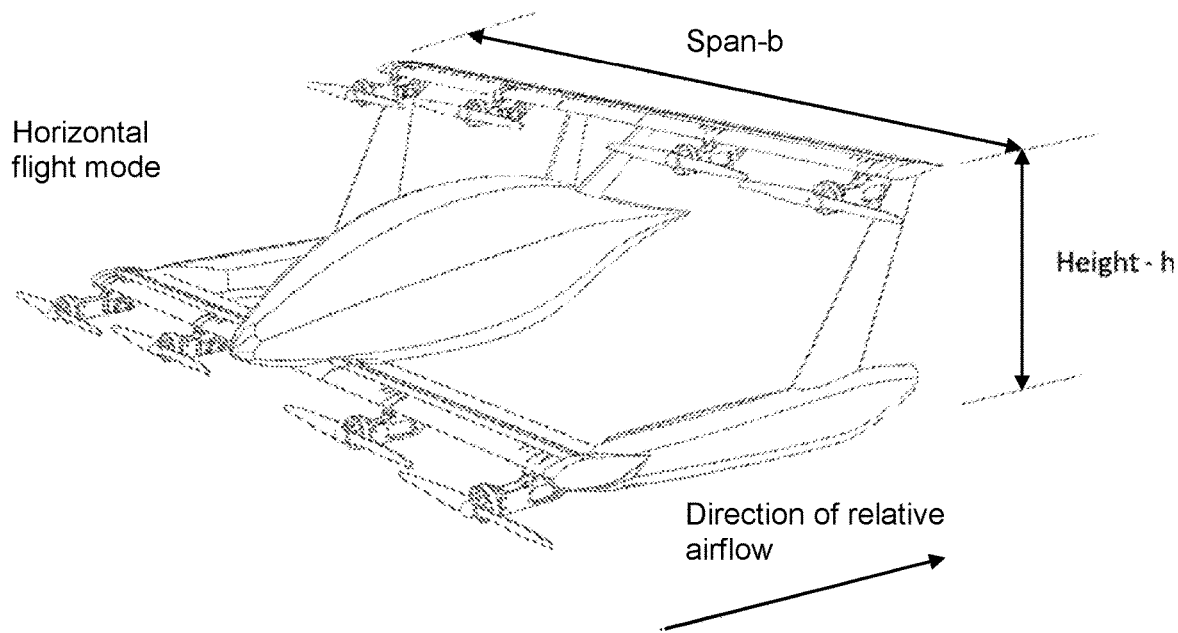
FIG. 23 shows the height to span ratio in horizontal flight of the fourth embodiment.
Figure 24:
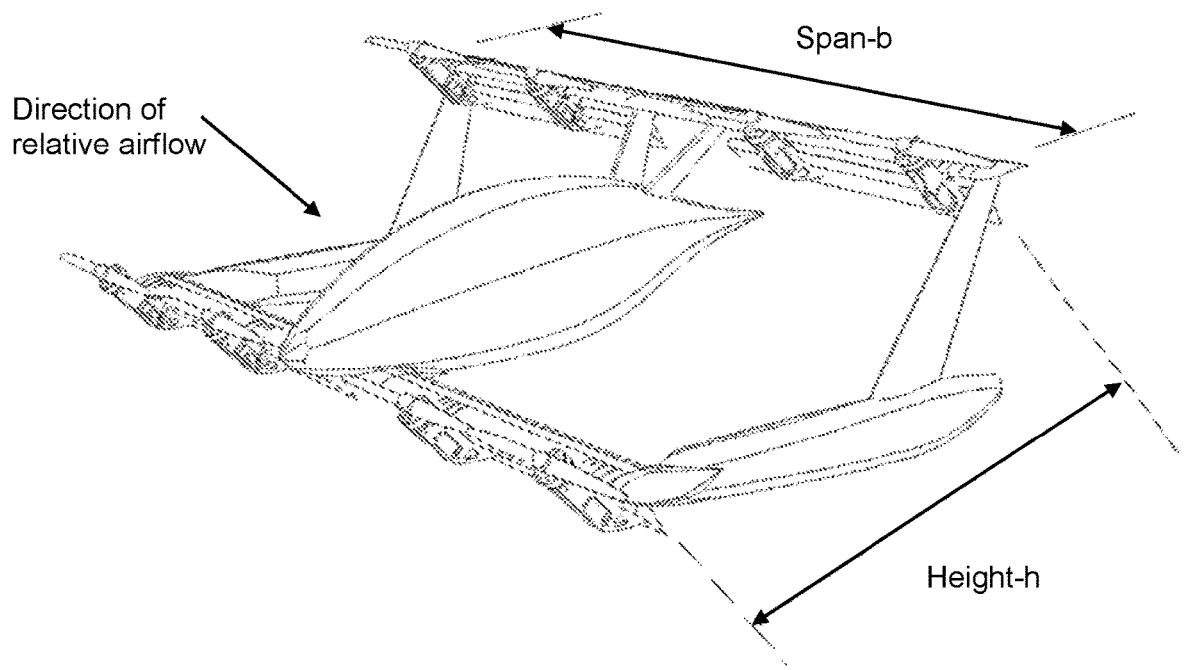
FIG. 24 shows the height to span ratio in vertical flight of the fourth embodiment.
Figure 25:
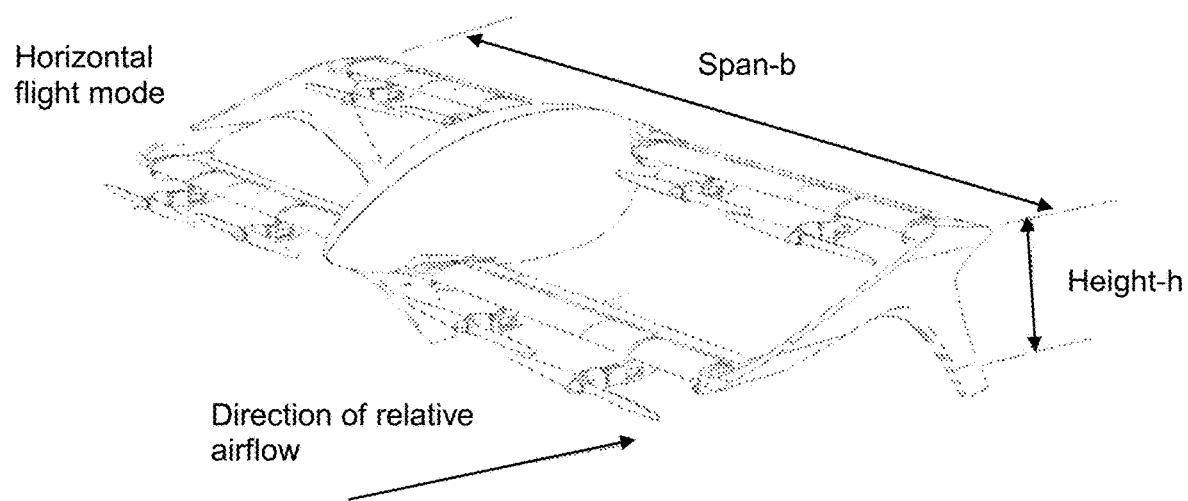
FIG. 25 shows the height to span ratio in horizontal flight of the fifth embodiment.
Figure 26:
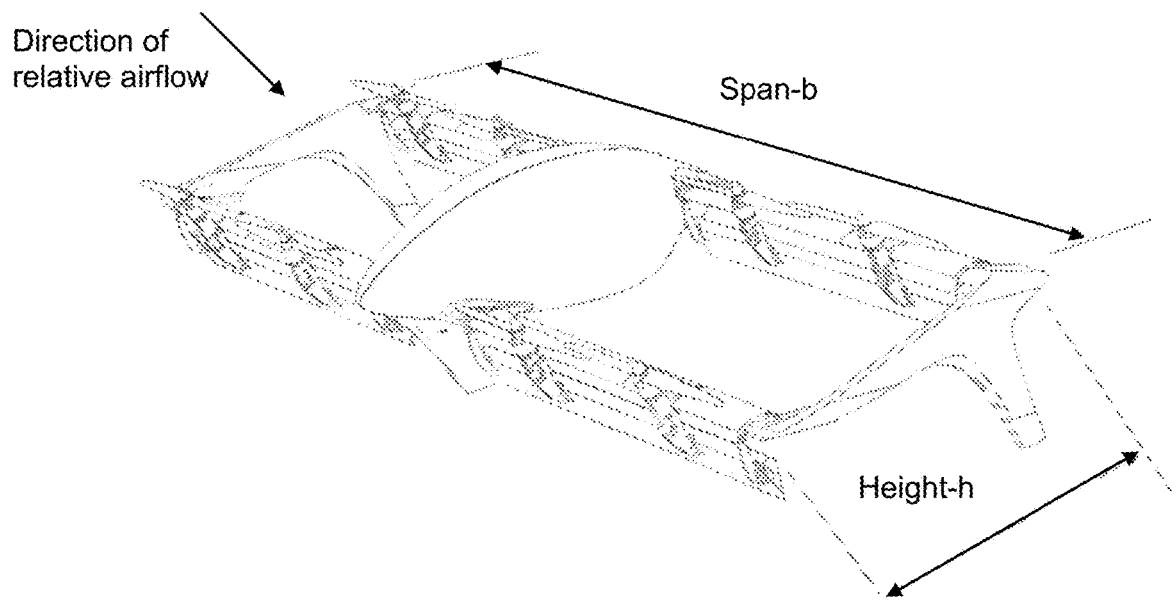
FIG. 26 shows the height to span ratio in vertical flight of the fifth embodiment.

In the embodiment of FIG. 22, battery/fuel pods 410 are located within the connecting members or webs 42 which join the forward wings 20, 22 and the rearward wings 30, 32. Furthermore, in this embodiment, the outermost motors 200 on the forward wings 20, 22 are located at or near the wing tips, in a low drag manner, in front of the battery/fuel pods 410, such that the fuel pod 410 is positioned behind and within the rotor 70 area during forward flight.

This arrangement of FIG. 22 provides reduced drag in high speed cruise flight as the wing tip drag and motor pod drag of an integrated unit are less than a separate wing tip and motor pod 195. Furthermore, the arrangement of FIG. 22 reduces rotor blockage in vertical flight mode, as the outboard propellers are only pushing high pressure air onto a smaller wing area.

This arrangement also reduces structural weight, as the mass in the wing tips can be used to reduce the bending moment on the wing structure in flight, hence providing a lighter overall structure.

This arrangement also has the potential to allow hot swappable batteries on the wing tips that will reduce down time between flights. Alternatively, the aircraft 10 can be reconfigured for different energy storage options such as battery in one configuration and hydrogen fuel cell, (with hydrogen tank with 350 or 700 Bar gaseous hydrogen tank) as another configuration. This may be a model choice at the factory or an operational choice by the end user.

Furthermore, the embodiment of FIG. 22 increases passenger safety in an emergency as the fuel/energy is located at the wing tips, and in the event of a fire it is remote from occupants, and in the event of an emergency landing the high mass objects are also remote from the cabin.

Advantageously, a box wing structure is more aerodynamically efficient than a conventional wing of the same size and can be more structurally efficient (therefore lighter).

Advantageously, the boxed wing structure provides additional rigidity.

Advantageously, the aircraft 10 reduces the weight of the bearings and tilt structure required when compared to a conventional tilt wing aircraft. This is because a conventional tilt wing requires a single, large bearing pair (one on either side of the aircraft fuselage) with a stiff structure that rotates.

Advantageously, the aircraft 10 provides a simple, low cost VTOL aircraft 10 for transport and aerial surveillance applications. The aircraft 10 reduces weight and complexity of similar systems. It can be manufactured at lower cost due to the use of simple continuous wing structure and the simplicity of the distributed tilt bearings/hinges. It is lower cost to develop different configurations as the structure does not require a torsionally stiff fuselage. This allows it to be designed so that the same basic wing and propulsion system could have several configurations with significantly different fuselage pods. Structural connection of the wingtips in a box-wing formation reduces the need for fuselage 55 torsional rigidity and simplifies the fuselage 55 structure. In practice, this allows different configuration fuselages 55 with the same, or very similar, wing 20, 22, 30, 32 structure.

Advantageously, the aircraft 20 allows the structure to have a lower weight for a given payload.

Figure 27:
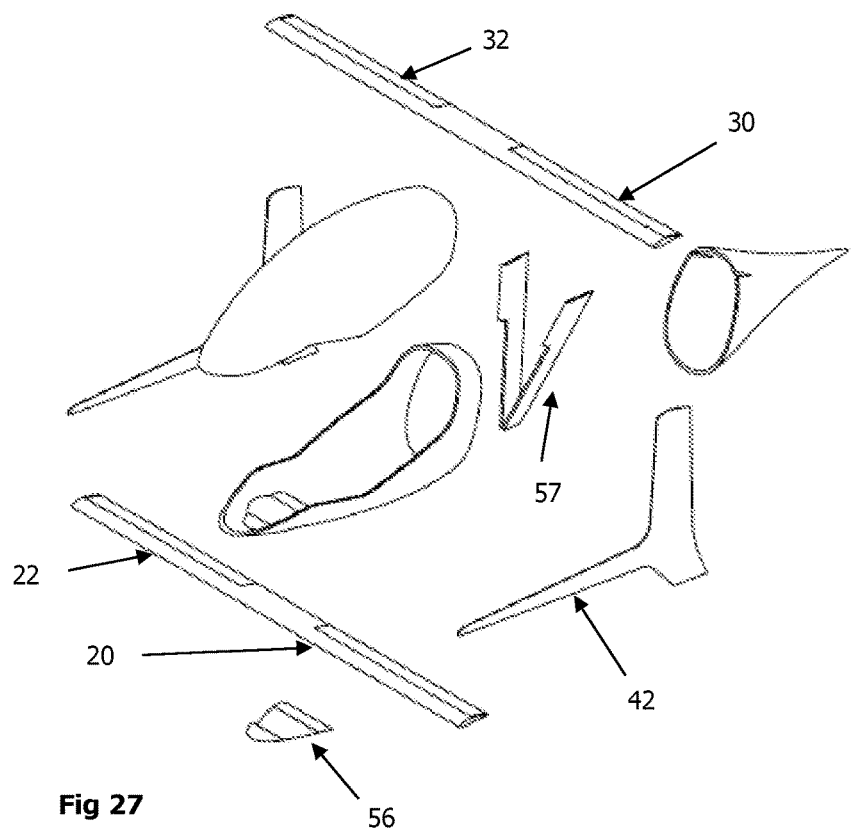
FIG. 27 shows the views of a manufacturing concept for the sixth embodiment.
Figure 28:
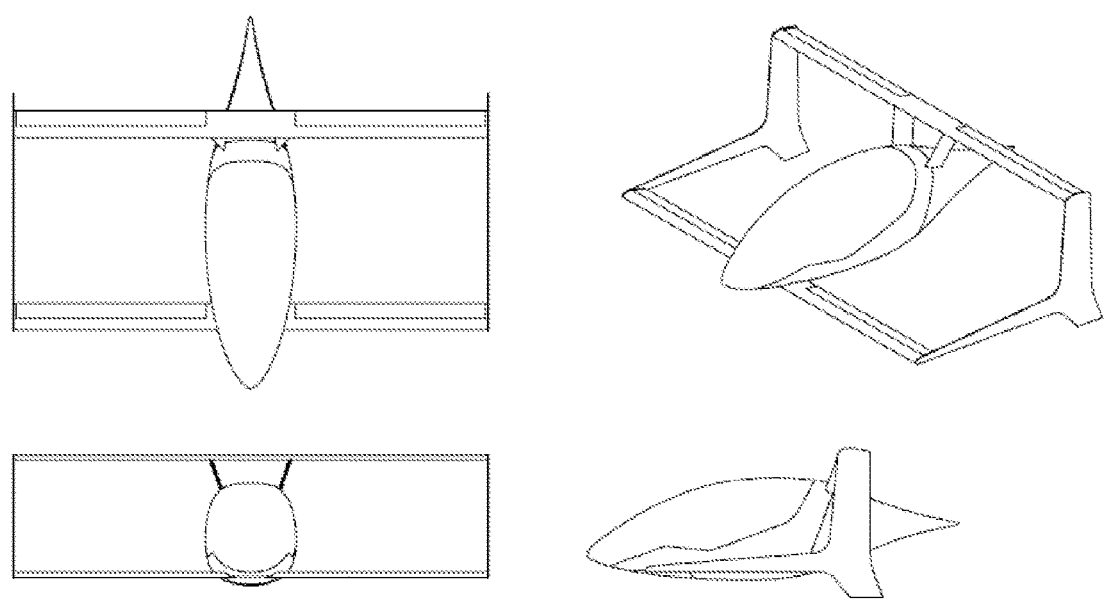
FIG. 28 shows three views of the sixth embodiment.

FIG. 27 depicts an example of an assembly of the main structural components of the aircraft 20. In this arrangement, the front wings 20, 22 and the rear wings 30,32 are each unitary. The front wings 20, 22 extend through a channel formed in the fuselage 55, and are held with a clamp 56. The upper wings 30, 32 are supported with a "V" support 57. The connecting members 42 are each separately formed, and generally "L" shaped.

Although the invention has been described with reference to specific examples, it will be appreciated by those skilled in the art that the invention may be embodied in many other forms.

The invention claimed is:

1. A vertical take-off and landing (VTOL) aircraft having:
a wing structure having right and left side forward wings; and
right and left side rearward wings, each of the right side wings being connected, and each of the left side wings being connected in a box wing configuration;

wherein each wing has a fixed leading edge and at least one moveable trailing control surface, wherein each wing has at least two motor pods having motors, a first motor has rotors having an axis of rotation which is downwardly inclined relative to the control surface, and a second motor has rotors having an axis of rotation which is upwardly inclined relative to the control surface, such that the first and second motors have different thrust lines, further wherein each motor pod is pivotally mounted to an underside of the fixed leading edge, and fixedly secured to the trailing control surface.

2. The vertical take-off and landing (VTOL) aircraft of claim 1, further comprising a mechanical actuator configured to pivot each motor pod and trailing control surface about a hinge point of the fixed leading edge.

3. The vertical take-off and landing (VTOL) aircraft of claim 2, wherein each actuator includes a mechanically driven rotating arm and a linkage.

4. The vertical take-off and landing (VTOL) aircraft of claim 3, wherein each rotating arm has a proximal end connected to an actuator motor of the corresponding motor pod, and each rotating arm has a distal end connected to a proximal end of the linkage, and a distal end of the linkage is pivotally connected to the fixed leading edge.

5. The vertical take-off and landing (VTOL) aircraft of claim 1, further comprising a leading edge slot located between the fixed leading edge and the trailing control surface.

6. The vertical take-off and landing (VTOL) aircraft of claim 5, further comprising an upper slot cover hingedly mounted to an upper side of the fixed leading edge, wherein the upper slot cover generally covers the leading edge slot in a forward flight configuration, and the leading edge slot is at least partially uncovered in a take-off and landing configuration.

7. The vertical take-off and landing (VTOL) aircraft of claim 5, further comprising a lower slot cover hingedly mounted to an underside of the fixed leading edge, the lower slot cover generally covers the leading edge slot in a forward flight configuration, and the leading edge slot is at least partially uncovered in a take-off and landing configuration.

8. The vertical take-off and landing (VTOL) aircraft of claim 7, wherein a trailing side of the lower slot cover and a trailing side of the upper slot cover are in abutment with each other to define an enclosed volume between the fixed leading edge, the upper slot cover and the lower slot cover.

9. The vertical take-off and landing (VTOL) aircraft of claim 8, wherein the trailing side of the lower slot cover and the trailing side of the upper slot cover are moveable and configured to slide relative to each other.

10. The vertical take-off and landing (VTOL) aircraft of claim 7, wherein the upper slot cover is curved having a concaved surface which is generally downwardly facing in a forward flight configuration.

11. The vertical take-off and landing (VTOL) aircraft of claim 7, wherein the lower slot cover is curved having a generally "S" curve profile, having an upwardly facing concave surface adjacent to the leading edge, and a downwardly facing concave surface adjacent to the trailing side in a forward flight configuration.

12. The vertical take-off and landing (VTOL) aircraft of claim 6, wherein the upper slot cover is defined by two or more members which are hingedly connected to achieve an articulated connection pivotal about an axis extending generally parallel with a longitudinal axis of the wing.

13. The vertical take-off and landing (VTOL) aircraft of claim 6, wherein the upper slot cover is defined by a flexible member and/or connected to the fixed leading edge by a flexible member, the flexible member being fabricated from a material which is flexible about an axis extending generally parallel with a longitudinal axis of the wing.

14. The vertical take-off and landing (VTOL) aircraft of claim 1, wherein the first and second motors are selectively operable at different rotation speeds to generate a turning moment to rotate the control surface relative to the fixed leading edge.

15. A vertical take-off and landing (VTOL) aircraft having:
a wing structure having right and left side forward mounted wings; and
right and left side rearward mounted wings, each of the right side wings being connected, and each of the left side wings being connected, to define a box wing structure;
each wing has a fixed leading edge and at least one moveable trailing control surface, and each wing has a first motor and a second motor, the motors being pivotally mounted to the fixed leading edge, and fixedly secured to the trailing control surface; and
a mechanical actuator configured to selectively pivot each motor and trailing control surface about a hinge point of the fixed leading edge;
wherein the first motor has a rotor having an axis of rotation which is downwardly inclined relative to the control surface, and the second motor has a rotor having an axis of rotation which is upwardly inclined relative to the control surface, such that the first and second motors have different thrust lines.

16. The vertical take-off and landing (VTOL) aircraft of claim 15, wherein connecting members join tips of each wing located on the same side of the aircraft, the connecting members each being defined by a first arm secured to the forward mounted wing, a second arm secured to the rearward mounted wing and an intermediate elbow located at a junction of the first and second arms.

17. The vertical take-off and landing (VTOL) aircraft of claim 15, wherein connecting members join tips of each wing located on the same side of the aircraft, the connecting members each having a generally linear body portion extending between the forward mounted wing and the rearward mounted wing.

18. The vertical take-off and landing (VTOL) aircraft of claim 16, wherein the first arm of the connecting member defines a pod for storage of batteries, fuel or other equipment.

19. The vertical take-off and landing (VTOL) aircraft of claim 18, wherein the pod is selectively removeable and interchangeable.

20. The vertical take-off and landing (VTOL) aircraft of claim 16, wherein the first arm of the connecting member defines a pod which provides a buoyant float configured for water landing and take-off.

21. The vertical take-off and landing (VTOL) aircraft of claim 18, wherein a distal motor is located at or near a tip region of each forward mounted wing, the distal motor being positioned generally in front of the connecting member.

22. The vertical take-off and landing (VTOL) aircraft of claim 15, wherein the aircraft has a height to span ratio in the range of:
0.14 to 0.3 in a horizontal flight configuration; and
0.3 to 0.6 in a vertical flight configuration.

23. The vertical take-off and landing (VTOL) aircraft of claim 15, wherein the trailing control surface has a length in profile of between about 50% to about 70% of a total chord length of the wing.

24. A method of controlling a vertical take-off and landing (VTOL) aircraft having a wing structure having right and left side forward mounted wings, and right and left side rearward mounted wings, each wing has a first motor and a second motor, the motors each being pivotally mounted to a fixed leading edge, and fixedly secured to a moveable trailing control surface, the first and second motors each having rotors having different thrust lines, the method including the steps of:
- mechanically actuating one of the moveable trailing control surfaces to selectively pivot each motor and the trailing control surface about a hinge point of the fixed leading edge; and
- aerodynamically actuating said moveable trailing control surface to selectively pivot each motor and the trailing control surface about the hinge point of the fixed leading edge,
- wherein the step of aerodynamic actuation includes operating the first and second motors at different rotational speeds.

25. The method of claim 24, wherein the mechanical actuation step includes rotating a mechanically driven rotating arm, the rotating arm having a proximal end connected to an actuator motor of one of the first and second motors, and the rotating arm has a distal end connected to a proximal end of the linkage, and a distal end of the linkage is pivotally connected to the fixed leading edge.

* * * * *